United States Patent
Yamaji

(10) Patent No.: US 10,212,656 B2
(45) Date of Patent: Feb. 19, 2019

(54) WIRELESS DEVICE, SENSOR UNIT, WIRELESS UNIT, AND METHOD FOR SETTING WIRELESS DEVICE

(71) Applicant: YOKOGAWA ELECTRIC CORPORATION, Musashino-shi, Tokyo (JP)

(72) Inventor: Masato Yamaji, Musashino (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 267 days.

(21) Appl. No.: 14/062,546

(22) Filed: Oct. 24, 2013

(65) Prior Publication Data
US 2014/0120843 A1    May 1, 2014

(30) Foreign Application Priority Data

Oct. 30, 2012   (JP) .................. 2012-238749
Aug. 15, 2013   (JP) .................. 2013-168897

(51) Int. Cl.
*G01D 11/24*  (2006.01)
*G01D 21/00*  (2006.01)
*H04W 52/02*  (2009.01)

(52) U.S. Cl.
CPC ...... *H04W 52/0209* (2013.01); *G01D 11/245* (2013.01); *G01D 21/00* (2013.01)

(58) Field of Classification Search
CPC ..... H04W 24/10; H04W 24/02; H04W 16/14; H04W 84/18; H04W 8/005; H04W 48/08;
(Continued)

(56) References Cited

U.S. PATENT DOCUMENTS 8,818,264 B2 *  8/2014  Yen ............... H04W 28/08
                                                          455/103
2001/0016891 A1   8/2001  Hagino
(Continued)

FOREIGN PATENT DOCUMENTS

CN    101421983 A    4/2009
CN    101715591 A    5/2010
(Continued)

OTHER PUBLICATIONS

Shuji Yamamoto et al., "World's First Wireless Field Instruments Based on ISA100.11a", Yokogawa Technical Report English Edition, 2010, pp. 13-16, vol. 53, No. 2.
(Continued)

*Primary Examiner* — Andrew Wendell
*Assistant Examiner* — Maryam Soltanzadeh
(74) *Attorney, Agent, or Firm* — Sughrue Mion, PLLC

(57) ABSTRACT

A wireless device may include a sensor unit and a wireless unit. The sensor unit may include: an input/output unit that measures or manipulating a state quantity in a process; a first local communication unit that performs local communication to transmit/receive measurement results or manipulation commands for the input/output unit; and a first supply unit that supplies power to the input/output unit and the first local communication unit. The wireless unit may include: a wireless communication unit that transmits/receives the measurement results or the manipulation commands for the input/output unit; a second local communication unit that performs local communication with the first local communication unit to transmit/receive the measurement results or the manipulation commands for the input/output unit; and a second supply unit that supplies power to the wireless communication unit and the second local communication unit.

18 Claims, 10 Drawing Sheets

(58) Field of Classification Search
CPC ... H04W 48/16; H04W 76/025; H04W 40/20; H04W 4/025; H04W 48/04; H04W 40/244; H04B 17/318; H04B 5/00; H04B 5/0025; H04B 5/0062; H04B 7/0834; H04B 5/0043; H04B 7/18558; A61B 5/0205; A61B 5/02055; A61B 5/7282; A61B 5/742; A61B 5/1118
See application file for complete search history.

(56) References Cited

U.S. PATENT DOCUMENTS

| | | | |
|---|---|---|---|
| 2003/0129944 | A1 | 7/2003 | Chang et al. |
| 2004/0260405 | A1* | 12/2004 | Eddie ................ G05B 19/0426 700/3 |
| 2005/0047356 | A1 | 3/2005 | Fujii et al. |
| 2005/0136909 | A1* | 6/2005 | Eguchi ................ H04L 61/2015 455/420 |
| 2007/0243830 | A1 | 10/2007 | Isenmann et al. |
| 2007/0294361 | A1 | 12/2007 | Arzig |
| 2008/0034864 | A1 | 2/2008 | Wittmer |
| 2008/0211664 | A1* | 9/2008 | Griech ................ G05B 19/042 340/539.1 |
| 2008/0294915 | A1 | 11/2008 | Juillerat et al. |
| 2009/0112373 | A1 | 4/2009 | Feldman et al. |
| 2009/0171163 | A1 | 7/2009 | Mates et al. |
| 2009/0174570 | A1 | 7/2009 | Hagg |
| 2010/0161081 | A1 | 6/2010 | Seiler et al. |
| 2010/0217108 | A1* | 8/2010 | Tauber et al. ................ 600/378 |
| 2010/0298957 | A1 | 11/2010 | Sanchez Rocha et al. |
| 2011/0022851 | A1 | 1/2011 | Yokota et al. |
| 2011/0153040 | A1* | 6/2011 | Wittmer ............ G05B 19/4185 700/79 |
| 2011/0212690 | A1* | 9/2011 | White et al. ................ 455/41.2 |
| 2012/0051211 | A1 | 3/2012 | Budampati et al. |
| 2012/0236768 | A1 | 9/2012 | Kolavennu et al. |
| 2012/0236769 | A1 | 9/2012 | Powell et al. |
| 2013/0025115 | A1* | 1/2013 | Stormbom ............ G01D 21/00 29/592.1 |
| 2013/0028300 | A1* | 1/2013 | Alberth ................ H04B 1/1607 375/219 |
| 2013/0107919 | A1 | 5/2013 | Burns et al. |
| 2014/0106687 | A1* | 4/2014 | Allgaier ................ H01F 38/14 455/90.2 |
| 2014/0126391 | A1 | 5/2014 | Liu et al. |
| 2014/0126442 | A1 | 5/2014 | Jafarian et al. |
| 2014/0172121 | A1 | 6/2014 | Li et al. |
| 2014/0321443 | A1 | 10/2014 | Samudrala et al. |
| 2015/0182461 | A1 | 7/2015 | Kim et al. |
| 2015/0182961 | A1* | 7/2015 | Arnold ................ B01L 99/00 709/219 |
| 2017/0331286 | A1 | 11/2017 | Sinreich |

FOREIGN PATENT DOCUMENTS

| | | |
|---|---|---|
| EP | 1223057 A2 | 7/2002 |
| EP | 1600736 A1 | 11/2005 |
| EP | 1757480 A1 | 2/2007 |
| EP | 2403301 A2 | 1/2012 |
| EP | 2276395 B1 | 8/2014 |
| JP | 09134492 A | 5/1997 |
| JP | 2000295792 A | 10/2000 |
| JP | 2001-236103 A | 8/2001 |
| JP | 2002185549 A | 6/2002 |
| JP | 2002209023 A | 7/2002 |
| JP | 200378939 A | 3/2003 |
| JP | 200748195 A | 2/2007 |
| JP | 2007174145 A | 7/2007 |
| JP | 2008500659 A | 1/2008 |
| JP | 2008129770 A | 6/2008 |
| JP | 2008219512 A | 9/2008 |
| JP | 2009290718 A | 12/2009 |
| JP | 2010277503 A | 12/2010 |
| JP | 2010541385 A | 12/2010 |
| JP | 2012109944 A | 6/2012 |
| WO | 2005031339 A1 | 4/2005 |
| WO | 2005116787 A1 | 12/2005 |
| WO | 2008/153332 A1 | 12/2008 |
| WO | 2009075919 A2 | 6/2009 |
| WO | 2009/127954 A2 | 10/2009 |
| WO | 2009119079 A1 | 10/2009 |
| WO | 2010047621 A1 | 4/2010 |
| WO | 2012129064 A1 | 9/2012 |

OTHER PUBLICATIONS

An Office Action dated Jan. 17, 2017, which issued during the prosecution of U.S. Appl. No. 14/786,683.

* cited by examiner

WIRELESS DEVICE, SENSOR UNIT, WIRELESS UNIT, AND METHOD FOR SETTING WIRELESS DEVICE

BACKGROUND OF THE INVENTION

Field of the Invention

The present invention relates to a wireless device, a sensor unit, a wireless unit, and a method for setting the wireless device.

Priority is claimed on Japanese Patent Application No. 2012-238749, filed Oct. 30, 2012, and Japanese Patent Application No. 2013-168897, filed Aug. 15, 2013, the contents of which are incorporated herein by reference.

Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

Conventionally, to achieve a high degree of automation at a plant, a factory, and the like, a distributed control system (DCS), in which on-site devices known as field devices (measuring devices and manipulating devices) and a control device for controlling these field devices are connected via a communications means, is constructed. While the field devices constituting such a distributed control system have hitherto mostly been ones that perform wired communication, in recent years field devices that perform wireless communication (wireless field devices) based on industrial wireless communication standards such as ISA100.11a and WirelessHART (Registered Trademark) are also being implemented.

In the wireless field device mentioned above, a sensor unit for measuring and manipulating a state quantity in the industrial process (e.g. pressure, temperature, flow rate, etc.), a wireless communication unit for performing wireless communication based on the industrial wireless communication standard, and a controller for collectively controlling the operations of the wireless field device, are assembled in a casing, and are operated by power supplied from a single power source. Since the wireless field devices need not be connected to a communication line or a communication path, and are basically installed independently at a plant or the like, most of them use an internal battery as their single power source.

In such a wireless field device, a power-saving operation is carried out to reduce battery consumption as much as possible. Specifically, when the wireless field device does not need to perform wireless communication, it is in a non-operational state (at least, a state where, to reduce power consumption, it does not send or receive wireless signals), and, only when a need to perform a wireless communication arises, it shifts to an operational state (a state that enables transmission and reception of wireless signals) and performs an operation of sending or receiving the wireless signal. Yamamoto Shūji et al., 'World's First ISA100.11a standard Wireless Field Device', Yokogawa Technical Report, Vol. 53, No. 2, 2010 discloses such a conventional wireless field device, wherein an input/output unit (sensor) and a wireless communication unit are provided in single structure.

As described above, in conventional wireless field devices, the sensor unit for measuring and manipulating a state quantity in the industrial process, the wireless communication unit for performing wireless communication, and the like, are assembled inside a casing and operated by power supplied from a single power source (a battery). Hence the conventional wireless field device has the following problems (1) to (3).

(1) Device Certification is Required for Each Type of Wireless Field Device

Wireless devices that perform wireless communication, and not only wireless field devices, must generally obtain certification that they conform to the laws of their respective nations (wireless standard certification). Since this wireless standard certification must basically be obtained for each type of wireless device, wireless field devices having, for example, the same type of wireless communication unit and yet having input/output units (including sensors and actuators) of different types or shapes must each obtain wireless standard certification.

In addition to the wireless standard certification mentioned above, wireless devices used in an environment where flammable gas is being used, such as wireless field devices installed at a plant, must also obtain certification that they confirm to explosion-prevention standards (explosion-prevention certification). This explosion-prevention certification requires a more complex procedure than the wireless standard certification mentioned above, and a long time is required to obtain it. Since the wireless standard certification and the explosion-prevention certification must be obtained separately in each country and region, for makers and vendors of wireless field devices and the like who attempt to expand their business on a world scale, there is a problem that enormous time, cost, and manpower are needed.

(2) Going Offline when Battery is Replaced

As described above, a wireless field device is operated by power supplied from an internal battery. In most wireless field devices, since the life of the battery is shorter than the life of the input/output unit containing the sensor or actuator, the battery must be replaced when its residual capacity has become low. When the battery is being replaced, the power supply to the wireless communication unit stops and so does the power supply to the input/output unit. Thus there is a problem that the input/output unit is unable to measure and manipulate the state quantity (i.e. it goes offline) while the battery is being replaced.

(3) Battery Cannot be Replaced while Plant is Operating

In the case of a wireless field device installed at a location where explosions must be prevented (an explosion-prevention area), the battery cannot be replaced while the plant is operating unless both the wireless field device and the battery meet explosion-prevention standards. Conceivable methods for replacing a battery when at least one of the wireless field device and the battery fails to meet explosion-prevention standards are: (a) replacing all batteries in explosion-prevention areas while the plant has stopped operating due to an inspection or the like and flammable gas is not being used, and (b) removing the wireless field device and replacing the battery in a location that is not an explosion-prevention area, and then reinstalling the wireless field device in its original location.

With the former method, the opportunity to replace the battery is limited to a time when the plant has stopped operating; in addition, a great many batteries must be replaced mechanically in a short time. Consequently, there is a problem that even batteries with sufficient residual capacity are inevitably replaced. With the latter method, since the wireless field device must be removed and then reinstalled, there is a problem that considerable time and cost is required.

SUMMARY

The present invention provides a wireless device, a sensor unit, a wireless unit, and a method for setting the wireless device that can greatly reduce device certification and enable a battery to be replaced easily while remaining online even while the plant is operating.

A wireless device may include a sensor unit and a wireless unit. The sensor unit may include: an input/output unit configured to perform at least one of measurement and manipulation of a state quantity in a process; a first local communication unit configured to perform local communication to transmit/receive at least one of measurement results by the input/output unit and manipulation commands for the input/output unit; and a first supply unit configured to supply power to the input/output unit and the first local communication unit. The wireless unit may include: a wireless communication unit configured to transmit/receive at least one of the measurement results by the input/output unit and the manipulation commands for the input/output unit; a second local communication unit configured to perform local communication with the first local communication unit to transmit/receive at least one of the measurement results by the input/output unit and the manipulation commands for the input/output unit; and a second supply unit configured to supply power to the wireless communication unit and the second local communication unit.

According to a preferred embodiment of the present invention, a state quantity in a process measured by an input/output unit of a sensor unit is output via first and second local communication units to the wireless unit, and is sent from a wireless communication unit of the wireless unit to the wireless network, while a manipulation command relating to the state quantity in the process sent via the wireless network is received by the wireless communication unit of the wireless unit, and then output via the second and first local communication units to the sensor unit, and the a manipulation based on the manipulation command is performed in the input/output unit of the sensor unit.

The first and second local communication units may perform the local communication contactlessly.

The sensor unit may include a first casing that houses at least the input/output unit and the first supply unit. The wireless unit may include a second casing that houses at least the wireless communication unit and the second supply unit.

The first casing may include a first signal transmission unit configured to allow transmission of signals to and from the first local communication unit housed in the first casing and the second local communication unit housed in the second casing. The second casing may include a second signal transmission unit configured to allow the transmission of the signals to and from the first local communication unit housed in the first casing and the second local communication unit housed in the second casing. The sensor unit and the wireless unit may be joined together such that the first signal transmission unit formed in the first casing and the second signal transmission unit formed in the second casing can transmit and receive the signals.

One of a first signal transmission unit, configured to allow transmission of signals from the first local communication unit housed in the first casing, and a second signal transmission unit, configured to allow transmission of signals from the second local communication unit housed in the second casing, may be formed in a first one of the first and second casings. One of the first local communication unit, arranged near the second signal transmission unit formed outside the first casing and in the second casing, and the second local communication unit, arranged near the first signal transmission unit formed outside the second casing and in the first casing, may be connected via a cable to a second one of the first and second casings.

The sensor unit and the wireless unit may include storage units configured to store at least one of first setting information to be set in the sensor unit and second setting information to be set in the wireless unit.

The first and second local communication units may be configured to be capable of transmitting/receiving the first and second setting information in addition to at least one of the measurement results by the input/output unit and the manipulation commands for the input/output unit.

The first supply unit may include a first power source configured to supply power to be supplied to the input/output unit and the first local communication unit. The second supply unit may include a second power source configured to supply power to be supplied to the wireless communication unit and the second local communication unit.

The first supply unit may include a first power source configured to supply power to be supplied to the input/output unit and the first local communication unit. The second supply unit may be configured to receive the power supplied from the first power source to supply the power to the wireless communication unit and the second local communication unit.

The second supply unit may include a second power source configured to supply power to be supplied to the wireless communication unit and the second local communication unit. The first supply unit may be configured to receive the power supplied from the second power source to supply the power to the input/output unit and the first local communication unit.

The first supply unit may be configured to supply power supplied from an external power source to the input/output unit and the first local communication unit. The second supply unit may be configured to supply power supplied from the external power source to the wireless communication unit and the second local communication unit.

The external power source may be configured to supply power to both the first and second supply units.

The external power source may be configured to supply power to a first one of the first and second supply unit. A second one of the first and second supply units, which the external power source does not supply power to, may be configured to receive power from the first one of the first and second supply units, which the external power source supplies power to.

The sensor unit and the wireless unit may include at least one of a first power transmission unit, configured to contactlessly transmit power between the first and second supply units, and a second power transmission unit, configured to contactlessly receive power from the external power source.

The first power transmission unit may be configured in a single structure with the first and second local communication units.

One of the sensor unit and the wireless unit may include an accumulation unit configured to accumulate power received by one of the first supply unit and the second supply unit.

A sensor unit for performing at least one of measurement and manipulation of a state quantity in a process, may include: an input/output unit configured to perform at least one of measurement and manipulation of the state quantity in the process; a local communication unit configured to be capable of performing local communication so as to transmit/receive at least one of measurement results by the input/output unit and manipulation commands for the input/output unit; a first supply unit configured to supply one of power from an internal power source and power from an external power source, to the input/output unit and the local communication unit.

A wireless unit for performing wireless communication via a wireless network, may include: a wireless communication unit configured to perform the wireless communication via the wireless network; a local communication unit configured to be capable of performing local communication so as to transmit/receive at least one of signals to be transmitted from the wireless communication unit and signals received by the wireless communication; and a second supply unit configured to supply one of power from an internal power source and power from an external power source, to the wireless communication unit and the local communication unit.

A method for setting a wireless device including a sensor unit configured to perform at least one of measurement and manipulation of a state quantity in a process, and a wireless unit configured to perform wireless communication via a wireless network, may include: performing local communication between the wireless unit and the sensor unit to transmit first setting information, which has been stored beforehand in the wireless unit and is to be set in the sensor unit, from the wireless unit to the sensor unit; and setting the first setting information in the sensor unit.

A method for setting a wireless device including an sensor unit configured to perform at least one of measurement and manipulation of a state quantity in a process, and a wireless unit configured to perform wireless communication via a wireless network, may include: registering first setting information to be set in the sensor unit, and second setting information to be set in the wireless unit, in the wireless unit; registering the first and second setting information registered in the wireless unit, in the sensor unit; and if the wireless unit has been replaced, setting the second setting information registered in the sensor unit in a new wireless unit.

According to a preferred embodiment of the present invention, the wireless device is configured in two units, namely the sensor unit for measuring the flow volume of the fluid and the wireless unit for performing wireless communication via a wireless network, and various types of information are sent and received between them via local communication between a first local communication unit provided in the sensor unit and the second local communication unit provided in the wireless unit. Therefore, device certification can be greatly reduced, and the battery can be replaced easily while staying online even when the plant is operational.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

Figure 1:
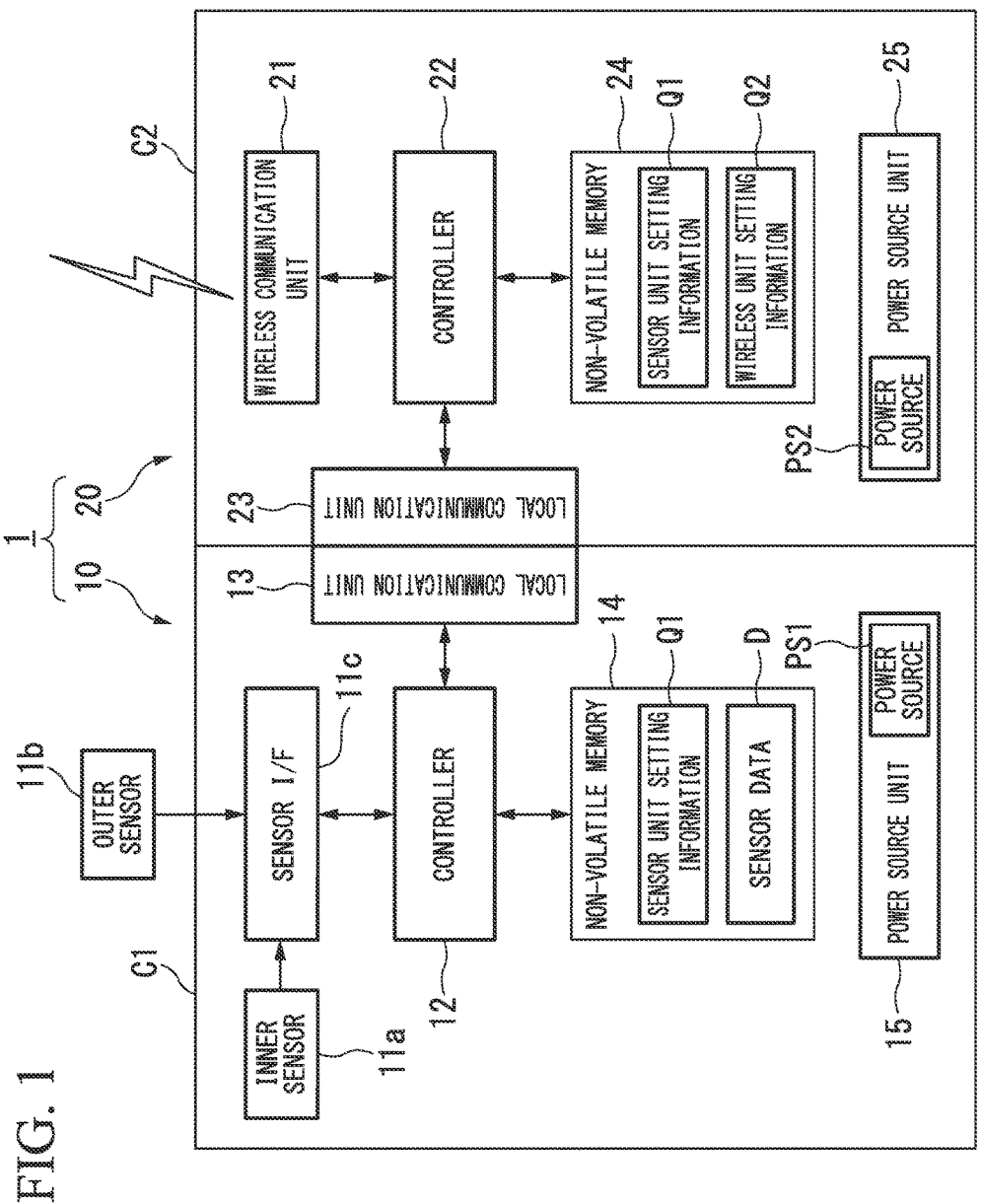
FIG. 1 is a block diagram illustrating a configuration of main units of a wireless device in accordance with a first preferred embodiment of the invention.

A wireless device, a sensor unit, a wireless unit, and a method for setting a wireless device in accordance with a first preferred embodiment of the present invention will be described in detail. FIG. 1 is a block diagram illustrating the configuration of main units of a wireless device in accordance with the first preferred embodiment of the invention. As illustrated in FIG. 1, a wireless device 1 of the first preferred embodiment includes a sensor unit 10 and a wireless unit 20. The wireless device 1 measures a state quantity in an industrial process and transmits a measurement result to a wireless network (not illustrated). In the first preferred embodiment, to facilitate understanding, the wireless device 1 is a field device that measures, as a state quantity in the industrial process, the flow volume of a fluid, and performs wireless communication in compliance with ISA100.11a.

The sensor unit 10 includes an inner sensor 11a (input/output unit), an outer sensor 11b, a sensor interface (sensor I/F) 11c (input/output unit), a controller 12, a local communication unit 13 (local communication unit, first local communication unit), a non-volatile memory 14 (storage unit), and a power source unit 15 (first supply unit). The sensor unit 10 measures the flow volume of the fluid and outputs a measurement result to the wireless unit 20. The constituent units of the sensor unit 10 other than the outer sensor 11b (the inner sensor 11a, the sensor interface 11c, the controller 12, the local communication unit 13, the non-volatile memory 14, and the power source unit 15) are housed in a box-shaped casing C1 that meets explosion-prevention standards.

The inner sensor 11a and the outer sensor 11b measure the flow volume of the fluid being measured, under the control of the controller 12. For example, an ultrasonic signal is transmitted through the fluid being measured and received on the other side of the fluid, and the flow volume of the fluid is determined from this received signal. Depending on the object being measured, either one of the inner sensor 11a and the outer sensor 11b can be omitted. The sensor interface 11c is provided between the inner and outer sensors 11a and 11b and the controller 12, and connects them to the controller 12.

The controller 12 coordinates and controls the operation of the sensor unit 10. Specifically, the controller 12 controls the inner and outer sensors 11a and 11b to make them measure the flow volume of the fluid in a predetermined cycle and store sensor data D, containing information indicating the measurement result correlated with information indicating the time when the measurement was taken, in the non-volatile memory 14 or in a volatile memory (not illustrated). The information indicating the time is useful after the wireless sensor has been replaced, as will be described later. The controller 12 also controls the local communication unit 13 to make it output the sensor data D stored in the non-volatile memory 14 to the wireless unit 20 at a predetermined timing. The controller 12 can also make the local communication unit 13 send and receive input/output unit setting information Q1 and wireless unit setting information Q2 (described in detail later) to and from the wireless unit 20.

To reduce the power consumption of the power source unit 15, the controller 12 controls the units of the sensor unit 10 and makes them perform a power-consumption operation. For example, when there is a need to measure the flow volume of the fluid, the controller 12 controls the inner sensor 11a and the outer sensor 11b to an active mode (operational mode), and at all other times keeps them in sleep mode (non-operational mode). In some cases, the controller 12 itself shifts to a power-saving mode (standby mode, etc.). During normal operations other than attaching or replacing the wireless unit 20, when there is a need to output the sensor data D to the wireless unit 20, the controller 12 controls the local communication unit 13 to active mode, and at all other times basically keeps it in sleep mode.

Under the control of the controller 12, the local communication unit 13 performs local communication (e.g. communication within a radius of approximately several meters) with a local communication unit 23 provided in the wireless unit 20. Specifically, the local communication unit 13 includes an infrared communication circuit for performing communication using infrared, a variable light communication circuit for performing communication using variable light, or a wireless communication circuit for performing near field communication, and performs contactless local communication with the local communication unit 23. If contactless communication with the wireless unit 20 is possible, communication terminals and such like are not exposed to the outside, and the wireless device 1 is therefore effective when installed in an explosion-prevention area. In the first preferred embodiment, to facilitate understanding, the local communication unit 13 performs local communication using infrared.

The non-volatile memory 14 is a flash read-only memory (ROM), an electrically erasable and programmable ROM (EEPROM), or such like, and stores the sensor data D, obtained as the measurement results of the inner sensor 11a and the outer sensor 11b, and the input/output unit setting information Q1 set in the sensor unit 10 (first setting information). The input/output unit setting information Q1 defines the operation of the sensor unit 10 and contains, for example, information indicating an interval, conditions, and such like for measuring the flow volume of the fluid. Incidentally, while FIG. 1 shows only one non-volatile memory 14, it is acceptable to provide a plurality of non-volatile memories and store the sensor data D and the input/output unit setting information Q1 in different non-volatile memories.

The power source unit 15 includes a power source PS1 (first power source) that supplies power, and a power source circuit (not illustrated) that converts power from the power source PS1 to a power suitable for use by the sensor unit 10. Under the control of the controller 12, the power source unit 15 supplies power to each unit of the sensor unit 10. The power source PS1 is a battery (e.g. a primary battery with extremely low self-discharge, such as a lithium thionyl chloride battery) or a power-generating circuit that performs so-called energy harvesting, such as a solar battery, or the like.

The wireless unit 20 includes a wireless communication unit 21, a controller 22, a local communication unit 23 (local communication unit, second local communication unit), a non-volatile memory 24 (storage unit), and a power source unit 25 (second supply unit), and sends the sensor data D from the sensor unit 10 to a wireless network (not illustrated). The wireless unit 20 houses the configurations described above (the wireless communication unit 21, the controller 22, the local communication unit 23, the non-volatile memory 24, and the power source unit 25) in a box-shaped casing C2 that meets explosion-prevention standards.

The wireless communication unit 21 performs wireless communication via the wireless network (not illustrated), under the control of the controller 22. Specifically, it performs wireless communication compliant with ISA100.11a. While in the description of the first preferred embodiment, the wireless communication unit 21 exclusively sends the sensor data D from the sensor unit 10 to the wireless network, the wireless communication unit 21 can also receive various data sent to it via the wireless network.

The controller 22 coordinates and controls the operations of the wireless unit 20. Specifically, the controller 22 controls the wireless communication unit 21 and makes it send the sensor data D from the sensor unit 10 to the wireless network. The controller 22 controls the local communication unit 23 and makes it receive the sensor data D output from the local communication unit 13 of the sensor unit 10. The controller 22 can also control the local communication unit 23, and make it send and receive the input/output unit setting information Q1 and the wireless unit setting information Q2 (described in detail later) to and from the sensor unit 10.

In like manner to the controller 12 provided in the sensor unit 10, to reduce the power consumption of the power source unit 25, the controller 22 controls the units of the wireless unit 20 and makes them perform a power-consumption operation. For example, during normal operations other than attaching or replacing the wireless unit 20, when there is a need to send sensor data D, the controller 22 controls the wireless communication unit 21 and the local communication unit 23 to active mode (operational mode), and at all other times basically keeps them in sleep mode (non-operational mode). In some cases, the controller 22 itself shifts to a power-saving mode (standby mode, etc.).

Under the control of the controller 22, the local communication unit 23 performs local communication with the local communication unit 13 provided in the sensor unit 10. Specifically, in like manner to the local communication unit 13, the local communication unit 23 includes an infrared communication circuit for performing communication using infrared, a variable light communication circuit for performing communication using variable light, or a wireless communication circuit for performing near field communication, and performs contactless local communication with the local communication unit 13. If contactless communication with the wireless unit 20 is possible, communication terminals and such like are not exposed to the outside, and the wireless device 1 is therefore effective when installed in an explosion-prevention area. As with the local communication unit 13, it is supposed that the local communication unit 23 performs local communication using infrared.

The non-volatile memory 24 is similar to the non-volatile memory 14 provided in the sensor unit 10, and stores the input/output unit setting information Q1 to be set in the sensor unit 10 and the wireless unit setting information Q2 (second setting information) to be set in the wireless unit 20. The wireless unit setting information Q2 defines the operation of the wireless unit 20 and contains, for example, information indicating timings, communication partners, and the like for performing wireless communication.

The power source unit 25 includes a power source PS2 (second power source) that supplies power, and a power source circuit (not illustrated) that converts power from the power source PS2 to a power suitable for use by the wireless unit 20. Under the control of the controller 22, the power source unit 25 supplies power to each unit of the wireless unit 20. The power source PS2 is a battery (e.g. a primary battery with extremely low self-discharge, such as a lithium thionyl chloride battery) or a power-generating circuit that performs so-called energy harvesting, such as a solar battery, or the like.

Figure 2A:
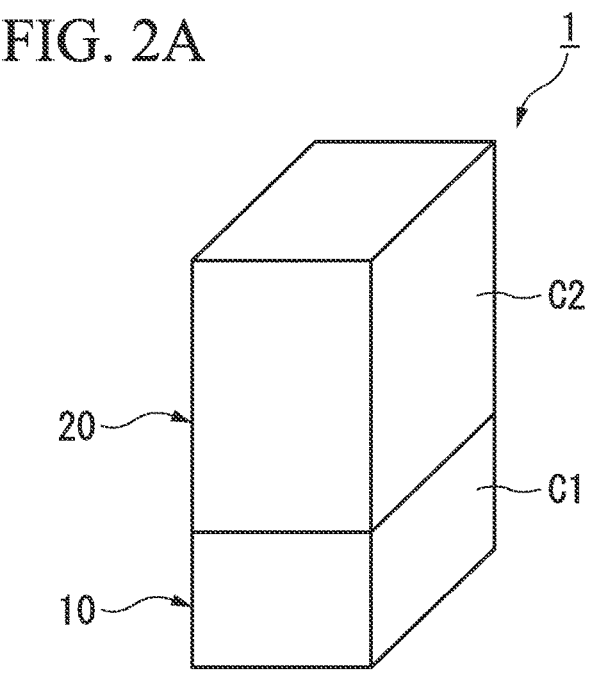
FIGS. 2A to 2C are schematic external perspective views illustrating the wireless device in accordance with the first preferred embodiment of the invention.
Figure 2B:
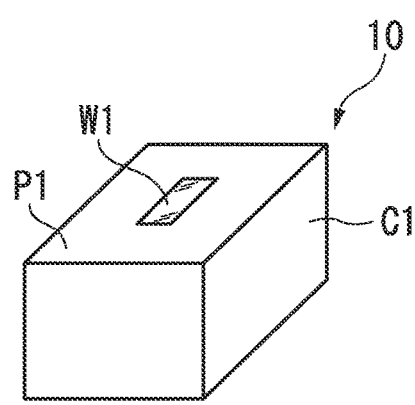
Figure 2C:
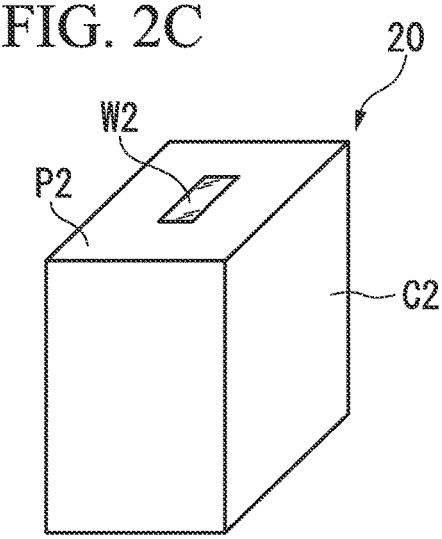

FIGS. 2A to 2C are schematic external perspective views illustrating a wireless device in accordance with the first preferred embodiment of the invention. FIG. 2A is an external perspective view of the sensor unit 10 and the wireless unit 20 in a joined state. FIG. 2B is a plan perspective view of the sensor unit 10. FIG. 2C is a bottom perspective view of the wireless unit 20. As illustrated in FIG. 2A, the wireless device 1 is formed by laminating the wireless unit 20 on the sensor unit 10 and joined them together in a single structure. While this example is one where the sensor unit 10 and the wireless unit 20 are laminated in the up-down direction, they can be laminated in any direction.

As illustrated in FIG. 2B, a rectangular window W1 (first signal transmission unit) is formed in the center of a top face P1 of the casing C1 forming one unit of the sensor unit 10. Similarly, as illustrated in FIG. 2C, a rectangular window W2 (second signal transmission unit) is formed in the center of a bottom face P2 of the casing C2 forming one unit of the wireless unit 20. These windows W1 and W2 allow the transmission of infrared rays that are sent and received between the local communication unit 13 housed in the casing C1 and the local communication unit 23 housed in the casing C2.

Specifically, the window W1 includes a transparent member (e.g. glass or reinforced plastic) for allowing transmission of infrared, provided in a rectangular opening formed in the center of the top face P1 of the casing C1. Similarly, the window W2 includes a transparent member (e.g. glass or reinforced plastic) for allowing transmission of infrared, provided in a rectangular opening formed in the center of the bottom face P2 of the casing C2. When the transparent members are provided in the openings formed in the top face P1 of the casing C1 and the bottom face of the casing C2 in this manner, the inner units of the casings C1 and C2 are sealed, thereby meeting explosion-prevention standards.

The sensor unit 10 illustrated in FIG. 2B and the wireless unit 20 illustrated in FIG. 2C are joined together with the top face P1 of the casing C1 facing the bottom face P2 of the casing C2, and with the window W1 formed in the top face P1 of the casing C1 opposite the window W2 formed in the bottom face P2 of the casing C2. Consequently, infrared rays emitted from the local communication unit 13 housed in the casing C1 pass through the windows W1 and W2 in that order and are received in the local communication unit 23 housed in the casing C2, while infrared rays emitted from the local communication unit 23 housed in the casing C2 pass through the windows W2 and W1 in that order and are received in the local communication unit 13 housed in the casing C1. It is also possible to prevent infrared light from the outside entering through the windows W1 and W2.

With the exception of a basic input/output unit for measuring air temperature and the like, the sensor unit 10 is attached to a piece of equipment to be measured (e.g. piping which a fluid flows through) or configured in a single structure with the equipment. It can therefore be supposed that most input/output units 10 are attached while the operation of the plant is suspended at the time of installing the equipment or carrying out renovation. In contrast, as described above in FIG. 2A, the wireless unit 20 is joined to the sensor unit 10, and both meet explosion-prevention standards. Therefore, the wireless unit 20 can be attached and replaced freely while the plant is operational.

Subsequently, an operation of the wireless device in the above configuration will be described. An operation performed when attaching a new wireless unit 20 to a sensor unit 10 which has been attached to the equipment (attachment operation), and an operation performed when replacing the wireless unit 20 attached to the sensor unit 10 (replacement operation), will be described in that order.

(Attachment Operation)

Figure 3:
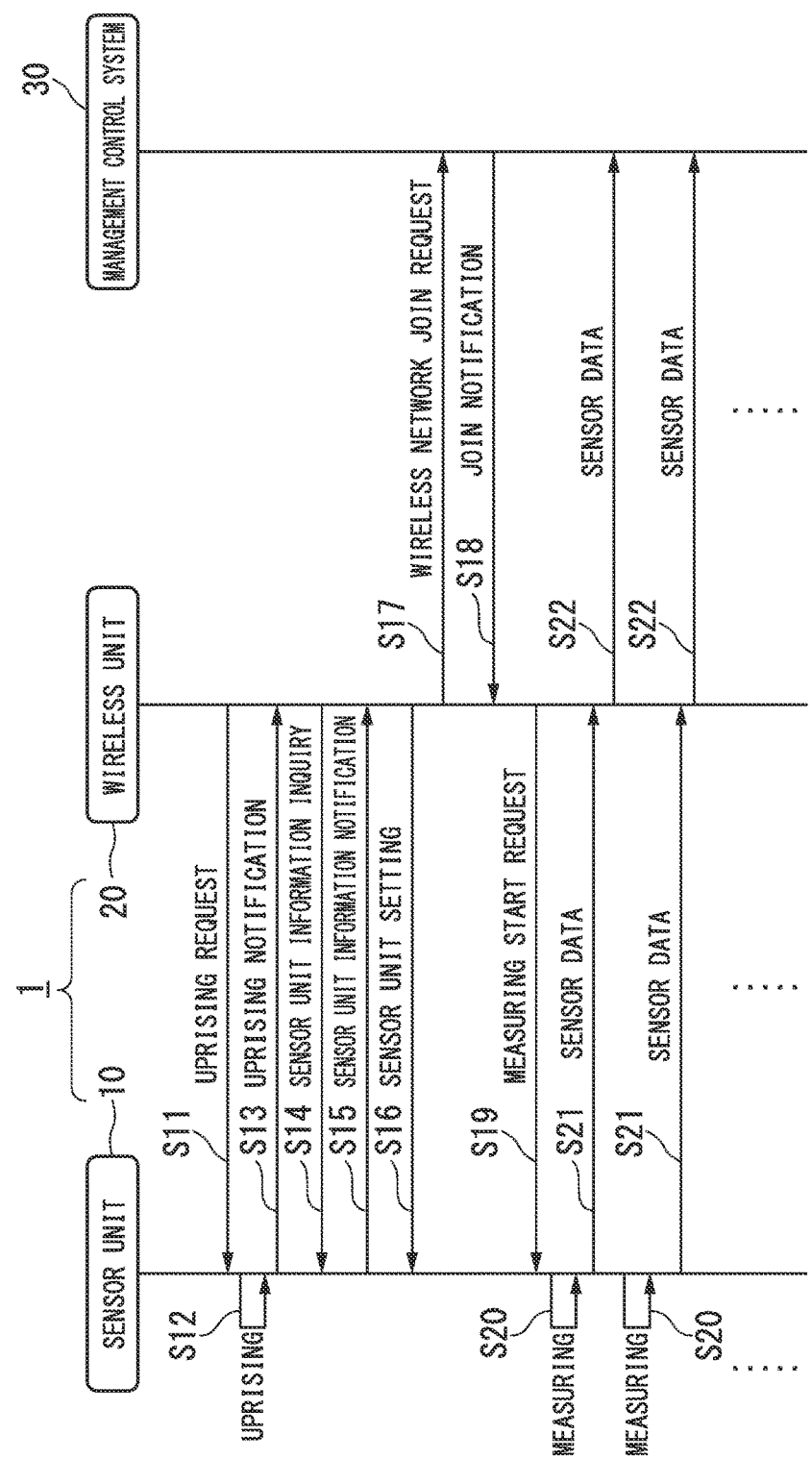
FIG. 3 is a timing chart for explanation of an operation performed when attaching the wireless device in accordance with the first preferred embodiment of the invention.

FIG. 3 is a timing chart for explanation of an operation performed when attaching the wireless device in accordance with the first preferred embodiment of the invention. A management control system 30 in FIG. 3 is a system for managing a wireless network (not illustrated) and controlling the operation of the wireless device 1, and includes, for example, a system manager and a control device of a distributed control system defined by ISA100.11a. In this example, while no input/output unit setting information Q1 illustrated in FIG. 1 is stored in the non-volatile memory 14 of the sensor unit 10, the input/output unit setting information Q1 and the wireless unit setting information Q2 illustrated in FIG. 1 are both stored beforehand in the non-volatile memory 24 of the wireless unit 20. In an initial state, the sensor unit 10 is in sleep mode.

When a new wireless unit 20 is attached to the sensor unit 10 while it is in sleep mode, firstly, an uprising request for cancelling the sleep mode of the sensor unit 10 is sent from the wireless unit 20 to the sensor unit 10 (step S11). When the uprising request is received from the wireless unit 20, in the sensor unit 10, the controller 12 performs control to cancel the sleep mode and shift to active mode (step S12). When the shift to active mode is complete, an uprising notification indicating that the mode has shifted to active mode is sent from the sensor unit 10 to the wireless unit 20 (step S13). The uprising request and uprising notification are sent and received by the local communication unit 13 of the sensor unit 10 and the local communication unit 23 of the wireless unit 20.

An input/output unit information inquiry for obtaining information identifying the sensor unit 10 (input/output unit information) is then sent from the wireless unit 20 to the sensor unit 10 (step S14). The input/output unit information indicates, for example, the model number, name, identifier, and such like of the sensor unit 10. When this input/output unit information inquiry is received at the sensor unit 10, an input/output unit information notification containing the input/output unit information is sent from the sensor unit 10 to the wireless unit 20 (Step S15). The input/output unit information inquiry and the input/output unit information notification are sent and received in the manner described above between the local communication unit 13 of the sensor unit 10 and the local communication unit 23 of the wireless unit 20.

When the input/output unit information notification is received at the wireless unit 20, the controller 22 determines whether the input/output unit setting information Q1 stored in the non-volatile memory 24 is suitable for the sensor unit 10. Specifically, it determines whether the input/output unit setting information Q1 is suitable for the sensor unit 10 based on the input/output unit information (information indicating the model number, name, identifier, and such like of the sensor unit 10) contained in the input/output unit information notification. When it is determined that the input/output unit setting information Q1 is suitable for the sensor unit 10, the input/output unit setting information Q1 stored in the non-volatile memory 24 is sent to the sensor unit 10 and stored in the non-volatile memory 14, thereby setting the input/output unit setting information Q1 in the sensor unit 10 (Step S16). The input/output unit setting information Q1 is sent by the local communication unit 23 of the wireless unit 20. When a plurality of pieces of input/output unit setting information Q1 are stored for each model number of the sensor unit 10, one of the pieces of input/output unit setting information Q1 that matches the model number is sent.

When the setting of the input/output unit setting information Q1 is completed, a request to join the wireless network (join request) is sent from the wireless unit 20 to the management control system 30 (Step S17). When the management control system 30 receives this join request, it determines whether to permit the wireless device 1 that made the join request (the wireless unit 20) to join the wireless network. When it determines to permit the wireless device 1 to join the wireless network, a join notification is sent from the management control system 30 to the wireless unit 20 (Step S18). This join notification enables the wireless device 1 (the wireless unit 20) to perform wireless communication via the wireless network. The join request is sent and the join notification is received by the wireless communication unit 21 of the wireless unit 20.

When these processes end, a measuring start request for starting the measuring of the flow volume of the fluid is sent from the wireless unit 20 to the sensor unit 10 (Step S19). When the sensor unit 10 receives this measuring start request, it shifts to active state and measures the flow volume of the fluid in a cycle determined by the input/output unit setting information Q1 set in Step S16 (Step 20), and outputs the sensor data D obtained from this measuring via the local communication unit 13 to the wireless unit 20 (Step S21). When the sensor data D is input from the sensor unit 10, the wireless unit 20 sends the sensor data D via the wireless communication unit 21 to the management control system 30 (Step S22).

When attaching the wireless unit 20 to the sensor unit 10 that has been attached to a piece of equipment in the manner described above, simply by attaching the wireless unit 20 which the input/output unit setting information Q1 and the wireless unit setting information Q2 have been stored in, the processes of setting the input/output unit setting information Q1 in the sensor unit 10 and joining the wireless network are carried out automatically, and the measuring of the flow volume of the fluid starts automatically. Since this removes the need for an on-site setting operation, which has hitherto been necessary, the time and cost required for the setting operation can be greatly reduced.

(Replacement Operation)

Figure 4:
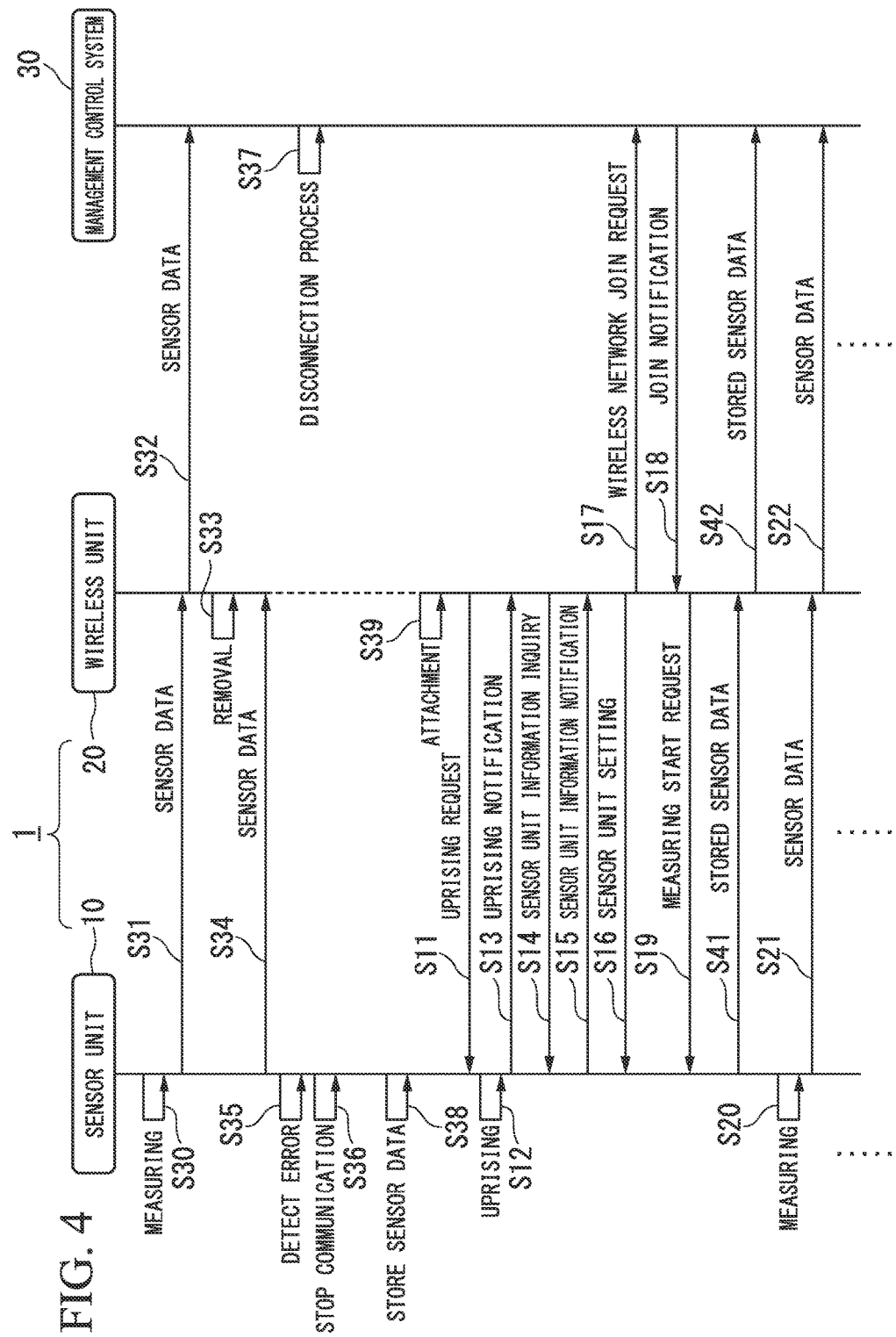
FIG. 4 is a timing chart for explanation of an operation performed when replacing the wireless device in accordance with the first preferred embodiment of the invention.

FIG. 4 is a timing chart for explanation of an operation performed when replacing the wireless device in accordance with the first preferred embodiment of the invention. The wireless unit 20 attached to the sensor unit 10 is replaced, for example, when the wireless unit 20 has broken down, when the residual capacity of the battery provided in the power source unit 25 of the wireless unit 20 has declined, or when communication between the sensor unit 10 and the wireless unit 20 (between the local communication units 13 and 23) has become impossible due to disconnection of the wireless unit 20 or the like. By way of example, a case will be describe the wireless unit 20 is replaced when the residual capacity of the battery has declined.

In the normal mode prior to replacing the wireless unit 20, the sensor unit 10 shifts to active mode in a predetermined cycle and measures the flow volume of the fluid (Step S30); in addition, it outputs sensor data D obtained from this measuring via the local communication unit 13 to the wireless unit 20 (Step S31). The sensor data D output from the sensor unit 10 to the wireless unit 20 is sent from the wireless communication unit 21 of the wireless unit 20 to the management control system 30 (Step S32).

When it is determined that, due to a decrease in the residual capacity of the battery provided in the power source unit 25 of the wireless unit 20, the wireless unit 20 needs to be replaced, an operator performs an operation of removing the wireless unit 20 from the sensor unit 10 (Step S33). Even after the wireless unit 20 has been removed, the sensor unit 10 shifts to active mode in a predetermined cycle, and outputs the sensor data D obtained by measuring the flow volume of the fluid via the local communication unit 13 to the wireless unit 20 (Step S34).

Since the wireless unit 20 has been removed from the sensor unit 10, it does not receive the sensor data D output from the local communication unit 13. Consequently, the sensor unit 10 detects a communication error between itself and the wireless unit 20 (Step S35), and the controller 12 of the sensor unit 10 stops communication via the local communication unit 13 (Step S36). When the wireless unit 20 has been removed, the management control system 30 performs a process of disconnecting the removed wireless unit 20 from the wireless network (Step S37).

Even after the sensor unit 10 has stopped communicating with the wireless unit 20, it shifts to active mode in a predetermined cycle, and continues the operation of obtaining sensor data D obtained by measuring the flow volume of the fluid. However, since the wireless unit 20 has been removed, the controller 12 of the sensor unit 10 stores the sensor data D that is obtained in the non-volatile memory 14 (Step S38). The sensor data D includes information indicating the measurement result of the flow volume of the fluid correlated with information indicating the time at which it was measured. After the sensor unit 10 has stopped communicating with the wireless unit 20, it can remain in sleep mode and not measure the flow volume of the fluid.

Let us suppose that an operator attaches a new wireless unit 20 while the sensor unit 10 is carrying out the operation described above (the operation of measuring the flow volume of the fluid in a predetermined cycle and storing the sensor data D in the non-volatile memory 14) (Step S39). Let us also suppose that both the input/output unit setting information Q1 and the wireless unit setting information Q2 illustrated in FIG. 1 have been stored beforehand in the non-volatile memory 24 of the wireless unit 20, and that the sensor unit 10 is in sleep mode when the new wireless unit 20 is attached.

An operation performed when attaching the new wireless unit 20 to the sensor unit 10 while it is in sleep mode is similar to the operation performed when attaching as described above. That is, an uprising request is sent from the wireless unit 20 to the sensor unit 10, which then shifts to active mode (Steps S11 to S13), an input/output unit information inquiry is performed (Steps S14 and S15), and the input/output unit setting information Q1 is set in the sensor unit 10 (Step S16). When these processes end, the wireless unit 20 is permitted to join the wireless network (Steps S17 and S18).

When the wireless unit 20 has joined the wireless network, it sends a measuring start request for starting the measuring of the flow volume of the fluid to the sensor unit 10 (Step S19). When this measuring start request is received, the controller 12 of the sensor unit 10 reads the sensor data D stored in the non-volatile memory 14 (the sensor data D that was obtained while the wireless unit 20 was being replaced), and controls the local communication unit 13 to output the sensor data D to the wireless unit 20 (Step S41). The sensor data D output from the sensor unit 10 to the wireless unit 20 is sent from the wireless communication unit 21 of the wireless unit 20 to the management control system 30 (Step S42).

When the sensor data D stored in the non-volatile memory 14 has been output, the sensor unit 10 shifts to active mode in a cycle defined by the input/output unit setting information Q1 set in Step S16 and measures the flow volume of the fluid (Step S20), and the sensor data D thereby obtained is output via the local communication unit 13 to the wireless unit 20 (Step S21). The sensor data D output from the sensor unit 10 to the wireless unit 20 is sent from the wireless communication unit 21 of the wireless unit 20 to the management control system 30 (Step S22).

When replacing the wireless unit 20 attached to the sensor unit 10 in the manner described above, simply by attaching the wireless unit 20 which the input/output unit setting information Q1 and the wireless unit setting information Q2 have been stored in, the processes of setting the input/output unit setting information Q1 in the sensor unit 10 and joining the wireless network are carried out automatically, and the measuring of the flow volume of the fluid starts automatically. Since this eliminates the need for an on-site setting operation, which has hitherto been necessary, the time and cost required for the setting operation can be greatly reduced.

In each of the attaching and removing operations described above, the input/output unit setting information Q1 stored in the newly attached wireless unit 20 is set in the sensor unit 10 (Step S16 in FIGS. 3 and 4). Conversely, however, the wireless unit setting information Q2 stored in the sensor unit 10 can be set in the wireless unit 20.

Figure 5:
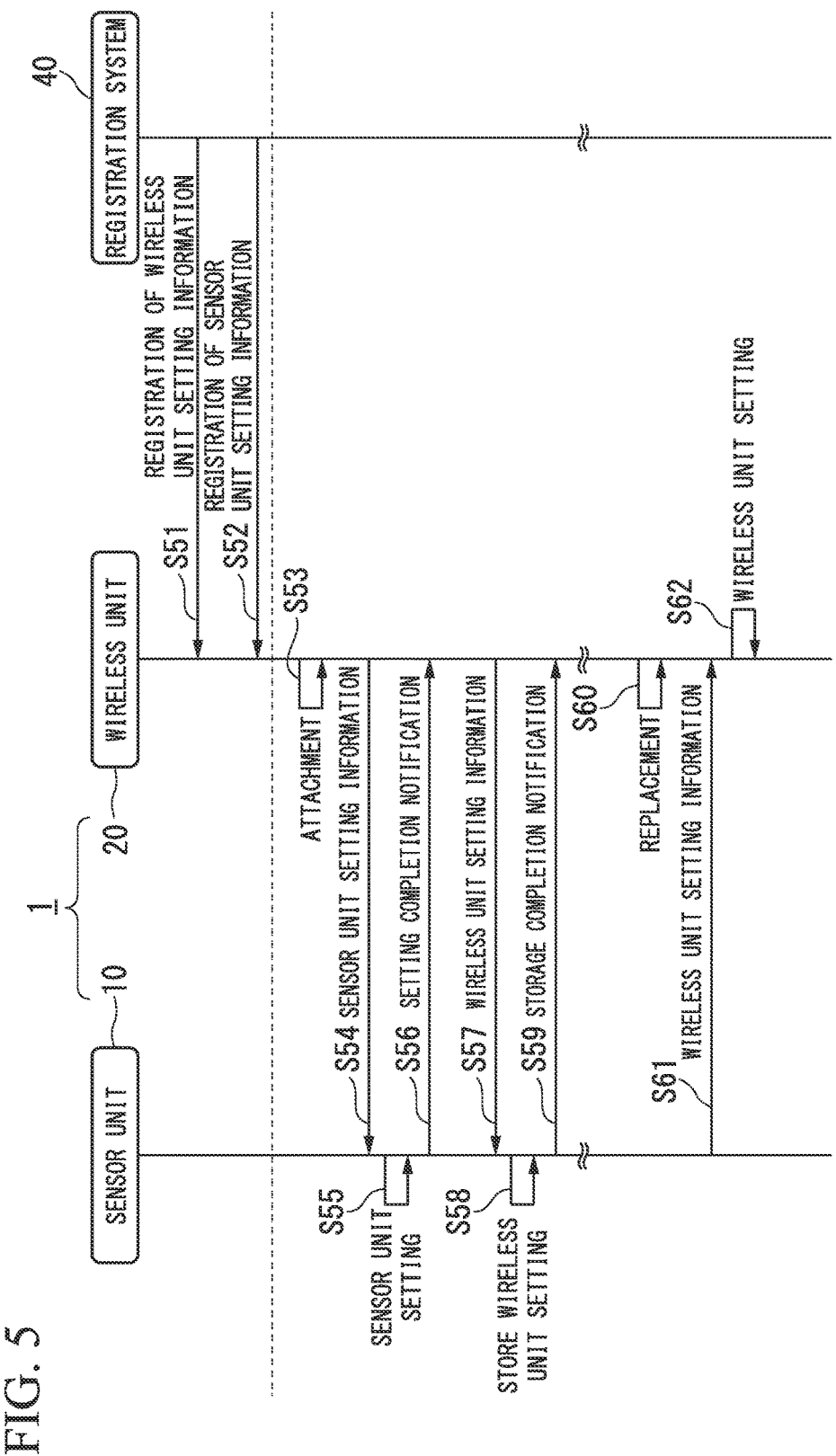
FIG. 5 is a timing chart illustrating an example of another operation of the wireless device in accordance with the first preferred embodiment of the invention.

FIG. 5 is a timing chart illustrating an example of another operation of a wireless device in accordance with the first preferred embodiment of the invention. In FIG. 5 a registration system 40 carries out various registrations in the wireless unit 20 (e.g. it registers the input/output unit setting information Q1 and the wireless unit setting information Q2). The registration system 40 can perform wireless communication via the wireless communication unit 21, or local communication via the local communication unit 23 and an internal communication port (not illustrated), and is realized by, for example, a personal computer.

Firstly, the wireless unit 20 for registration is carried to the installation location of the registration system 40 (e.g. a management room at the plant), and the registration system 40 makes various registrations in it. Specifically, an operator manipulates the registration system 40, thereby registering the wireless unit setting information Q2 in the wireless unit 20 (Step S51: first step), and registering the input/output unit setting information Q1 in the wireless unit 20 (Step S52: first step). The input/output unit setting information Q1 and the wireless unit setting information Q2 that were registered are stored in the non-volatile memory 24 of the wireless unit 20.

When the registration is complete, the wireless unit 20 that was subjected to registration is carried from the installation location of the registration system 40 to the site (the installation location of the sensor unit 10), where it is attached to the sensor unit 10 (Step S53). When the wireless unit 20 is attached to the sensor unit 10, the input/output unit setting information Q1 is sent from the wireless unit 20 to the sensor unit 10 (Step S54). The input/output unit setting information Q1 is sent by the local communication unit 23 of the wireless unit 20.

When the input/output unit setting information Q1 is received from the wireless unit 20, the controller 12 of the sensor unit 10 stores the received input/output unit setting information Q1 in the non-volatile memory 14, and performs a setting process based on the input/output unit setting information Q1 (Step S55: second step). When this setting process is complete, the controller 12 of the sensor unit 10 controls the local communication unit 13 and sends a setting completion notification indicating that the setting is complete to the wireless unit 20 (Step S56).

When the setting completion notification is received from the sensor unit 10, the controller 22 of the wireless unit 20 reads the wireless unit setting information Q2 from the non-volatile memory 24, and controls the local communication unit 23 to send it to the wireless unit 20 (Step S57). When the wireless unit setting information Q2 is received from the wireless unit 20, the controller 12 of the sensor unit 10 stores the received wireless unit setting information Q2 in the non-volatile memory 14 (Step S58: second step). When this setting process is complete, the controller 12 of the sensor unit 10 controls the local communication unit 13 and sends a storage completion notification indicating that storage is complete to the wireless unit 20 (Step S59).

When these processes end, the wireless device 1 operates normally under the control of the controller 12 provided in the sensor unit 10 and the controller 22 provided in the wireless unit 20. That is, it shifts to active mode in a predetermined cycle, the flow volume of the fluid is measured by the sensor unit 10, the sensor data D obtained by this measuring is output from the sensor unit 10 to the wireless unit 20 and sent to the wireless network (not illustrated).

Let us suppose that, while the wireless device 1 is operating as above, due to a decrease in the residual capacity of the battery provided in the power source unit 25 of the wireless unit 20, the wireless unit 20 has been replaced by a new wireless unit 20 (Step S60). Let us also suppose that one of the input/output unit setting information Q1 and the wireless unit setting information Q2 illustrated in FIG. 1 is stored in the non-volatile memory 24 of the new wireless unit 20.

When the wireless unit 20 is replaced, the controller 12 of the sensor unit 10 reads the wireless unit setting information Q2 that was stored in the non-volatile memory 14 in the process of Step S53, and controls the local communication unit 13 to send it to the wireless unit 20 (Step S61). When the wireless unit setting information Q2 is received from the sensor unit 10, the controller 22 of the wireless unit 20 stores the received wireless unit setting information Q2 in the non-volatile memory 24, and performs a setting process based on the wireless unit setting information Q2 (Step S62: third step). When this setting process is complete, the wireless unit 20 can perform operations defined by the wireless unit setting information Q2.

Thus, in the example illustrated in FIG. 5, the sensor unit 10 is set based on the input/output unit setting information Q1 registered in the wireless unit 20, and the wireless unit setting information Q2 registered in the wireless unit 20 is stored in the non-volatile memory 14 of the sensor unit 10. When the wireless unit 20 has been replaced, the wireless unit setting information Q2 stored in the sensor unit 10 is sent to the wireless unit 20, and the wireless unit 20 is set based on the wireless unit setting information Q2. Therefore, when replacing the wireless unit 20, since it is only necessary to attach a wireless unit 20 that does not require setting and registration of the input/output unit setting information Q1 and the wireless unit setting information Q2, the work, time, and cost require to replace the wireless unit 20 can be greatly reduced.

As described above, in the first preferred embodiment, the wireless device 1 is configured in two units, namely the sensor unit 10 for measuring the flow volume of the fluid and the wireless unit 20 for performing wireless communication via a wireless network, and various types of information are sent and received between them via local communication between the local communication unit 13 provided in the sensor unit 10 and the local communication unit 23 provided in the wireless unit 20. This enables the wireless unit 20 to be used in common with various types of input/output units 10, and since the wireless device 1 therefore only needs to be authenticated once for use worldwide, certification can be made extremely convenient. In addition, since the wireless unit 20 is used in common, the cost can be reduced by mass production.

Furthermore, since the sensor unit 10 and the wireless unit 20 run on power from separate sources (power units 15 and 25), when replacing the wireless unit 20, it is possible to continue measuring the flow volume of the fluid without taking the sensor unit 10 offline. Also, since local communication between the sensor unit 10 and the wireless unit 20 is performed by the local communication units 13 and 23, this is effective in meeting explosion-prevention standards. Moreover, the wireless unit 20 can be replaced easily, regardless of whether the plant is operational.

Furthermore, in the first preferred embodiment, the input/output unit setting information Q1 needed for setting the sensor unit 10 and the wireless unit setting information Q2 needed for setting the wireless unit 20 are sent and received between the sensor unit 10 and the wireless unit 20 via the local communication units 13 and 23. Since this removes the need for an on-site setting operation, which has hitherto been necessary, the time and cost required for the setting operation can be greatly reduced.

While the wireless device, the sensor unit, the wireless unit, and the method for setting the wireless device in accordance with a preferred embodiment of the invention have been described above, the invention is not limited to the first preferred embodiment and can be modified freely within the scope of the invention. For example, while in the wireless device 1 described in the preferred embodiment, the casing C1 of the sensor unit 10 and the casing C2 of the wireless unit 20 are joined in a single structure, they need not be joined together, provided that local communication is possible between them.

Figure 6A:
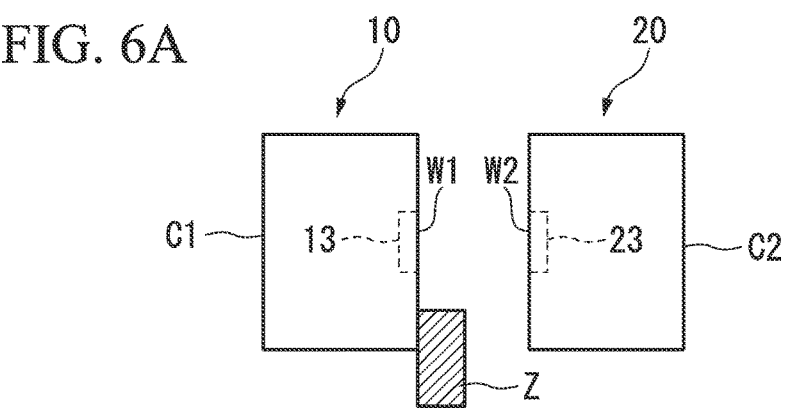
FIGS. 6A to 6C are diagrams illustrating a modification of the wireless device in accordance with the first preferred embodiment of the invention.
Figure 6B:
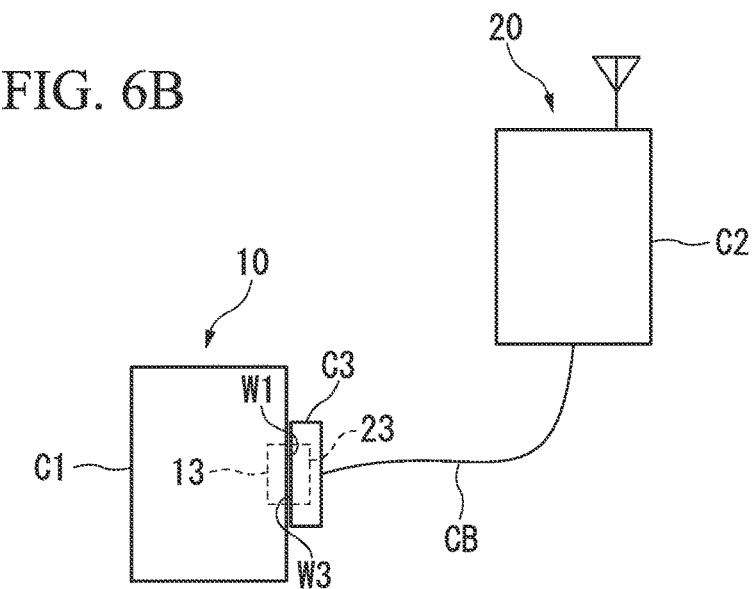
Figure 6C:
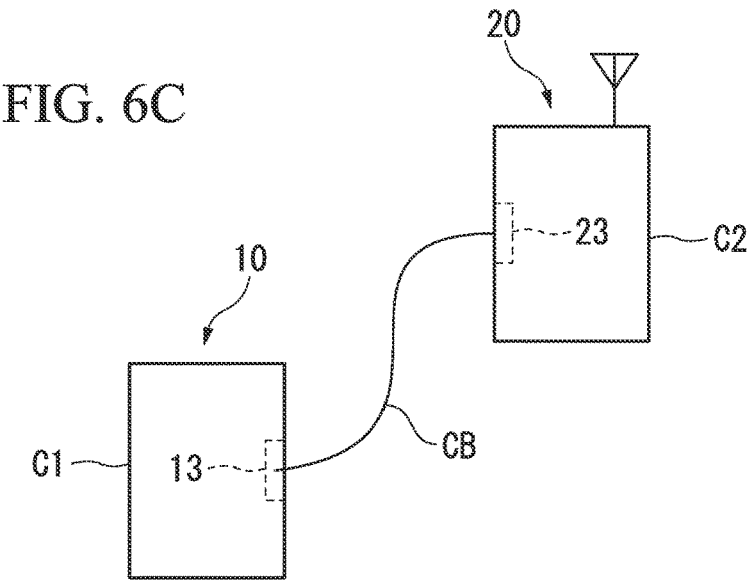

FIGS. 6A to 6C are diagrams illustrating modifications of the wireless device in accordance with the first preferred embodiment of the invention. In the wireless device illustrated in FIG. 6A, the sensor unit 10 and the wireless unit 20 are arranged at a distance from each other (a distance within a range that allows local communication between the local communication unit 13 and the local communication unit 23), with the window W1 formed in the casing C1 opposite the window W2 formed in the casing C2. This arrangement is useful when an obstacle Z is disposed between the sensor unit 10 and the wireless unit 20, making it impossible to join the casing C1 of the sensor unit 10 to the casing C2 of the wireless unit 20.

In the wireless device illustrated in FIG. 6B, the wireless unit 20 includes the casing C2 and an auxiliary casing C3. Of the wireless communication unit 21, the controller 22, the local communication unit 23, the non-volatile memory 24, and the power source unit 25 illustrated in FIG. 1, only the local communication unit 23 is housed in the auxiliary casing C3, which is connected to the casing C2 via a cable CB. A window W3 similar to the window W2 formed in the casing C2 illustrated in FIG. 6A is formed in the auxiliary casing C3, and the auxiliary casing C3 is arranged near the casing C1 with the window W2 opposite the window W1 formed in the casing C1. The wireless device with such a configuration is useful when, for example, the wireless unit 20 is arranged higher than the sensor unit 10 (e.g. near the highest point in the plant where wireless communication with the management control system 30 can be performed).

In the wireless device illustrated in FIG. 6B, a window W1 is formed in one of the casings C1 and C2 (here, the casing C1) to allow transmission of signals from the local communication unit 13 housed in the casing C1, and the local communication unit 23 is connected via the cable CB to another one of the casings C1 and C2 (casing C2), the local communication unit 23 being arranged outside the casing C2 and near the window W1 formed in the casing C1.

In a converse configuration to the example illustrated in FIG. 6B, it is acceptable if the sensor unit 10 includes the casing C1 and an auxiliary casing, and, of the inner sensor 11a, the outer sensor 11b, the sensor interface 11c, the controller 12, the local communication unit 13, the non-volatile memory 14, and the power source unit 15 illustrated in FIG. 1, only the local communication unit 13 is housed in the auxiliary casing, and the auxiliary casing is connected to the casing C1 via a cable. That is, a window W2 is formed in one of the casings C1 and C2 (casing C2) to allow transmission of signals from the local communication unit 23 housed in the casing C2, and the local communication unit 13 is connected via the cable CB to another one of the casings C1 and C2 (casing C1), the local communication unit 23 being arranged outside the casing C1 and near the window W2 formed in the casing C2.

In the wireless device illustrated in FIG. 6C, the local communication unit 13 provided in the sensor unit 10 and the local communication unit 23 provided in the wireless unit 20 both perform wired communication, and are connected via the cable CB. In a wireless device with such a configuration, while the cable CB must be removed when replacing the wireless unit 20, such an arrangement is acceptable as long as it meets explosion-prevention standards.

Furthermore, in the preferred embodiment described above, the power source PS1 that supplies the power for operating the sensor unit 10 is provided in the power source unit 15 of the sensor unit 10, while the power source PS2 that supplies the power for operating the wireless unit 20 is provided in the power source unit 25 of the wireless unit 20. However, such a power source can be provided outside the sensor unit 10 and the wireless unit 20, or provided only in one of them.

FIGS. 7 to 10 are diagrams of other modifications of the wireless device in accordance with the first preferred embodiment of the invention. In FIGS. 7 to 10, blocks identical with (or equivalent to) those in FIG. 1 are designated with identical reference numerals. In the wireless device illustrated in FIG. 7, the sensor unit 10 includes a power source connection unit 16 (first supply unit) instead of the power source unit 15, the wireless unit 20 includes a power source connection unit 26 (second supply unit) instead of the power source unit 25, and an external power source PS0 is connected to these power source connection units 16 and 26. A battery such as a primary battery or a secondary battery, a direct current, a power-generation circuit that performs energy harvesting (such as a solar battery), or the like, can be used as the external power source PS0.

The power source connection units 16 and 26 each include a power-receiving circuit (not illustrated) that receives power from the external power source PS0, and a conversion circuit (not illustrated) that converts the power received by the receiving circuit to a power suitable for use by the sensor unit 10. The power source connection unit 16, under the control of the controller 12, supplies power from the external power source PS0 to each unit of the sensor unit 10, and the power connection unit 26, under the control of the controller 22, supplies power from the external power source PS0 to each unit of the wireless unit 20. Thus the sensor unit 10 and the wireless unit 20 are both operated by power supplied from the external power source PS0 provided outside them.

Figure 7:
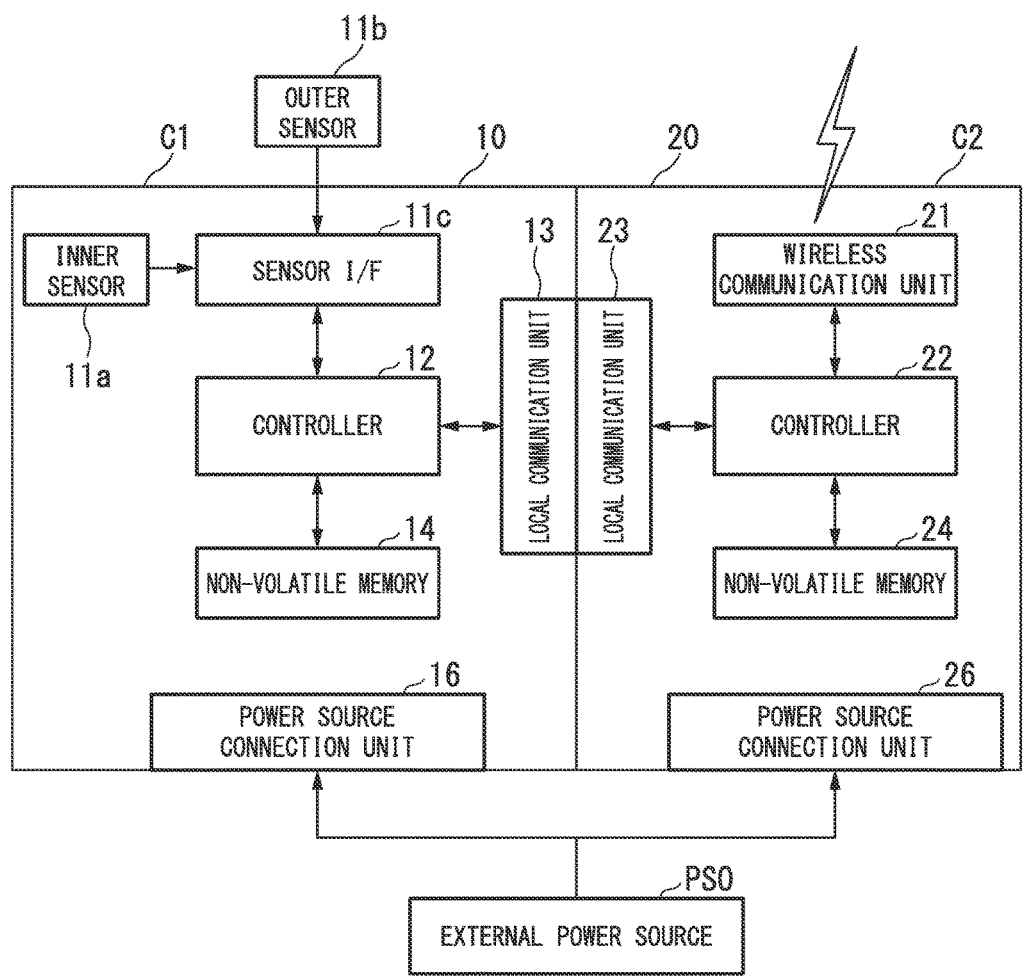
FIG. 7 is a diagram illustrating another modification of the wireless device in accordance with the preferred embodiment of the invention.

In the wireless device illustrated in FIG. 7, the external power source PS0 is connected to both the sensor unit 10 and the wireless unit 20, and supplies power to both of them. Therefore, even when the wireless unit 20 is replaced, power continues to be supplied from the external power source PS0 to the sensor unit 10. The wireless device illustrated in FIG. 7 can therefore continue to measure the flow volume of the fluid without taking the sensor unit 10 offline. It is acceptable to provide two external power sources PS0, with one of them supplying power to the sensor unit 10 and the other supplying power to the wireless unit 20.

Figure 8:
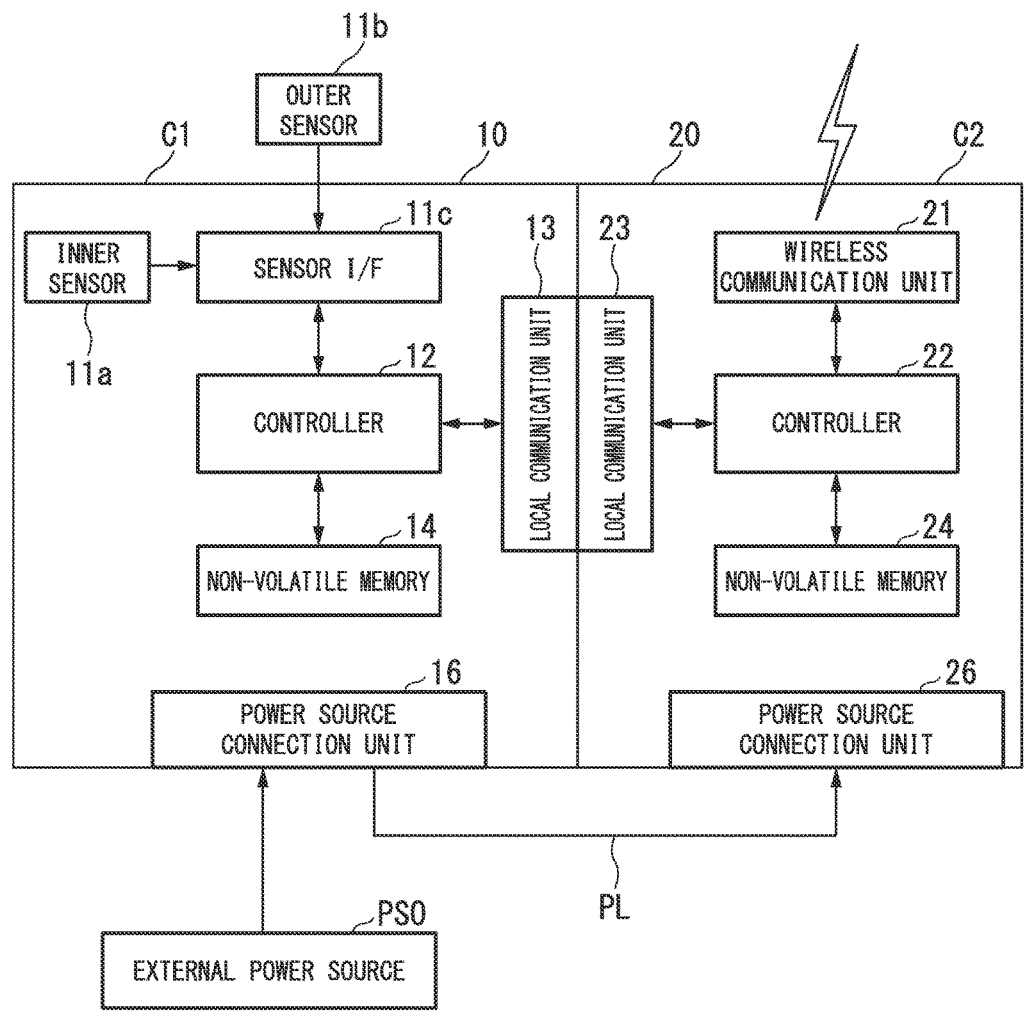
FIG. 8 is a diagram illustrating another modification of the wireless device in accordance with the preferred embodiment of the invention.

In the wireless device illustrated in FIG. 8, like the one illustrated in FIG. 7, the sensor unit 10 includes the power source connection unit 16 and the wireless unit 20 includes the power connection unit 26. In the wireless device illustrated in FIG. 8, however, the external power source PS0 is connected only to the power source connection unit 16 of the sensor unit 10, and the power source connection unit 16 of the sensor unit 10 and the power connection unit 26 of the wireless unit 20 are separately connected by a power line PL.

In the wireless device having this configuration, power from the external power source PS0 is input to the power source connection unit 16 and converted to power suitable for use by the sensor unit 10, and is then supplied to each unit of the sensor unit 10. Some of the power input to the power source connection unit 16 (power from the external power source PS0) is input via the power line PL to the power connection unit 26 and converted to power suitable for use by the wireless unit 20, and is then supplied to each unit of the wireless unit 20.

Thus, in the wireless device illustrated in FIG. 8, since power from the external power source PS0 is supplied to the sensor unit 10 via the sensor unit 10, the power supply from the external power source PS0 to the sensor unit 10 continues even when the wireless unit 20 is being replaced. Therefore, the wireless device illustrated in FIG. 8 can similarly continue to measure the flow volume of the fluid without taking the sensor unit 10 offline.

In the wireless device illustrated in FIG. 8, since power from the external power source PS0 is supplied to the wireless unit 20 via the sensor unit 10, the conversion circuit of the power connection unit 26 (the circuit that converts the power received by the receiver circuit of the power connection unit 26 to power suitable for use by the wireless unit 20) can be provided in the sensor unit 10. Although this slightly increases the cost of the sensor unit 10, which is not replaced, the cost of the replaceable wireless unit 20 can be reduced. In a converse configuration to the example illustrated in FIG. 8, it is acceptable to connect the external power source PS0 to the power connection unit 26, and to supply power from the external power source PS0 via the wireless unit 20 to the sensor unit 10.

Figure 9:
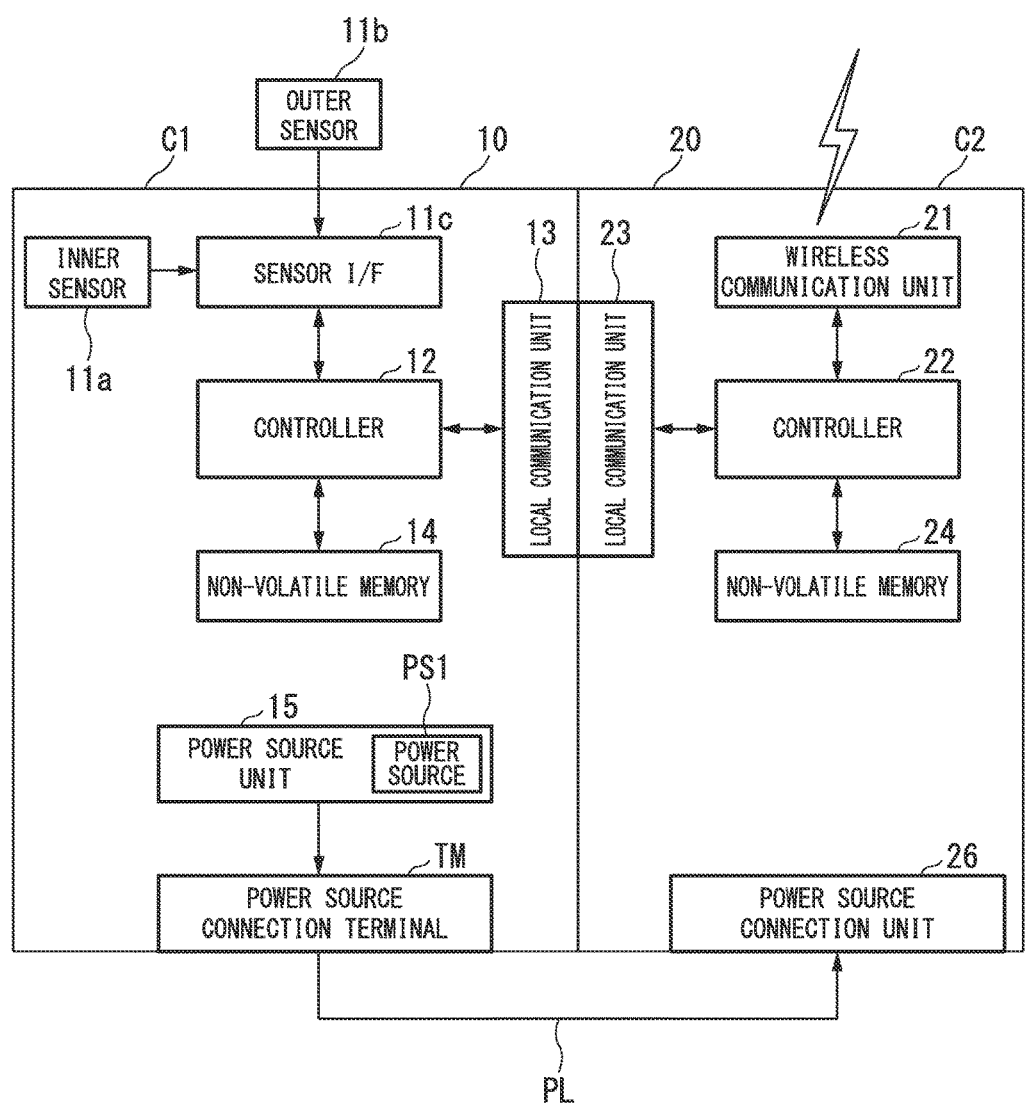
FIG. 9 is a diagram illustrating another modification of the wireless device in accordance with the preferred embodiment of the invention.

In the wireless device illustrated in FIG. 9, the sensor unit 10 includes, in addition to the power source unit 15 (first supply unit), a power source connection terminal TM. The power source connection terminal TM of the sensor unit 10 and the power connection unit 26 of the wireless unit 20 are connected by a power line PL. The configuration of the wireless unit 20 is similar to that illustrated in FIGS. 7 and 8. The power source connection terminal TM supplies power from the power source PS1 (first power source) provided in the power source unit 15 to the outside (the wireless unit 20 connected by the power line PL).

In the wireless device having this configuration, in the same manner as the sensor unit 10 illustrated in FIG. 1, the power of the power source PS1 provided in the power source unit 15 is converted to power suitable for use by the sensor unit 10 by a power source circuit (not illustrated) provided in the power source unit 15, and is then supplied to each unit of the sensor unit 10. Also, some of the power from the power source PS1 is input via the power source connection terminal TM and the power line PL to the power connection unit 26 and converted to power suitable for use by the wireless unit 20, and is then supplied to each unit of the wireless unit 20.

Thus in the wireless device illustrated in FIG. 9, since power from the power source PS1 provided in the sensor unit 10 is supplied to the sensor unit 10, and is also supplied via the power source connection terminal TM and the power line PL to the wireless unit 20, even when the wireless unit 20 is replaced, the power supply from the power source PS1 to the sensor unit 10 continues. Therefore, the wireless device illustrated in FIG. 9 can continue to measure the flow volume of the fluid without taking the sensor unit 10 offline.

In the wireless device illustrated in FIG. 9, since power from the power source PS1 provided in the sensor unit 10 is supplied via the power source connection terminal TM and the power line PL to the wireless unit 20, the conversion circuit of the power connection unit 26 can be provided in the sensor unit 10 in similar manner to the wireless device illustrated in FIG. 8. This can reduce the cost of the wireless unit 20. In a converse configuration to the example illustrated in FIG. 9, it is acceptable if the power source unit 25 (second supply unit: see FIG. 1) and the power source connection terminal TM are provided in the wireless unit 20, and the power source connection terminal TM of the wireless unit 20 is connected to the sensor unit 10 (the one illustrated in FIGS. 7 and 8) via the power line PL. In this configuration, power from the power source PS2 (second power source) provided in the wireless unit 20 is supplied to the wireless unit 20, and is also supplied via the power source connection terminal TM and the power line PL to the sensor unit 10.

Figure 10:
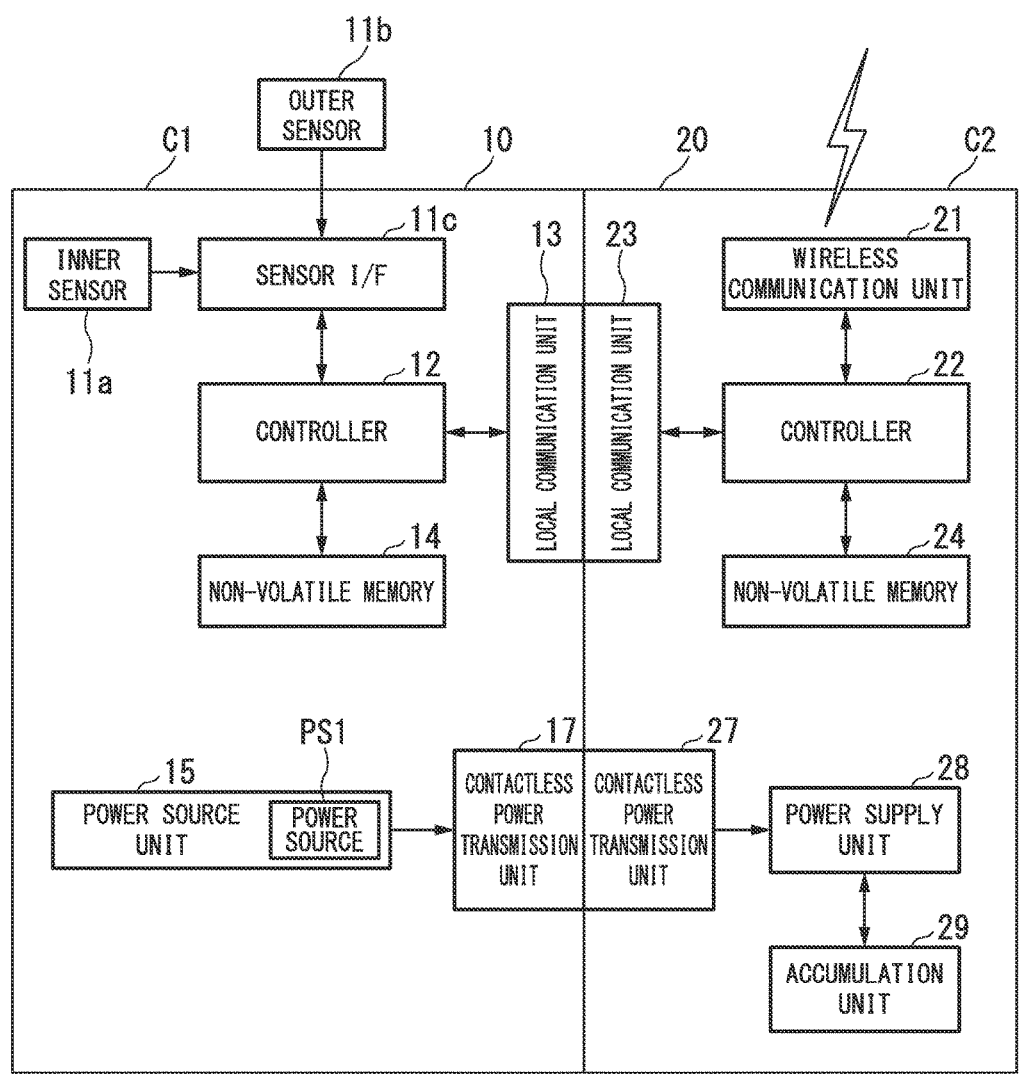
FIG. 10 is a diagram illustrating another modification of the wireless device in accordance with the preferred embodiment of the invention.

In the wireless device illustrated in FIG. 10, the sensor unit 10 includes, in addition to the power source unit 15 (first supply unit), a contactless power transmission unit 17 (power transmission unit), and the wireless unit 20 includes, instead of the power source unit 25, a contactless power transmission unit 27 (power transmission unit), a power supply unit 28 (second supply unit), and an accumulation unit 29. In the wireless device having this configuration, power from the sensor unit 10 to the wireless unit 20 is transmitted contactlessly.

The contactless power transmission unit 17 includes, for example, an inverter (not illustrated) that converts DC power to AC power and a power-transmitting coil (not illustrated) connected to the inverter, and converts power (DC power) from the power source PS1 to AC power and transmits it. The contactless power transmission unit 27 includes, for example, a power-receiving coil (not illustrated) and a converter (not illustrated) that converts power (AC power) received by the power-receiving coil to DC power, and receives power transmitted from the contactless power transmission unit 17 and converts it to DC power.

To increase the power transmission efficiency, the contactless power transmission units 17 and 27 are arranged such that the power-transmitting coil and the power-receiving coil are near each other. When the casing C1 of the sensor unit 10 and the casing C2 of the wireless unit 20 are made from a magnetic material such as iron alloy, windows similar to the windows W1 and W2 in FIG. 2 are formed in them, and it is ensured that magnetic material is not disposed between the power-transmitting coil and the power-receiving coil.

The power supply unit 28 includes a conversion circuit (not illustrated) that converts power (DC power) from the contactless power transmission unit 27 to power suitable for use by the wireless unit 20, and, under the control of the controller 22, supplies the power converted by the conversion circuit to each unit of the wireless unit 20. The accumulation unit 29 includes, for example, a capacitor, and charges with power from the contactless power transmission unit 27 or discharges accumulated power. The accumulation unit 29 is provided to prevent the wireless unit 20 from immediately ceasing operation if the power supply from the sensor unit 10 temporarily stops.

In the wireless device having this configuration, as in the sensor unit 10 illustrated in FIG. 1, power from the power source PS1 provided in the power source unit 15 is converted by a power source circuit (not illustrated) to power suitable for use by the sensor unit 10, and is then supplied to each unit of the sensor unit 10. Some of the power from the power source PS1 is transmitted contactlessly from the contactless power transmission unit 17 to the contactless power transmission unit 27, converted by the power supply unit 28 to power suitable for use by the wireless unit 20, and then supplied to each unit of the wireless unit 20.

In this way, in the wireless device illustrated in FIG. 10, as in the wireless device illustrated in FIG. 1, illustrated in FIG. 9, power from the power source PS1 provided in the sensor unit 10 is supplied to the sensor unit 10, and is also supplied via the contactless power transmission units 17 and 27 to the wireless unit 20, whereby, even when the wireless unit 20 is replaced, the power supply from the power source unit PS1 to the sensor unit 10 continues. Therefore, the wireless device illustrated in FIG. 10 can continue to measure the flow volume of the fluid without taking the sensor unit 10 offline.

In a converse configuration to the example illustrated in FIG. 10, it is acceptable to provide the power source unit 25 (second supply unit: see FIG. 1) in the wireless unit 20, to provide units corresponding to the power supply unit 28 and the accumulation unit 29 in the sensor unit 10, and to swap the contactless power transmission units 17 and 27 of the sensor unit 10 and the wireless unit 20. In this configuration, power from the power source PS2 (second power source) provided in the wireless unit 20 is supplied to the sensor unit 10 via the contactless power transmission units 17 and 27.

The configuration is not limited to one where power is only transmitted contactlessly between the sensor unit 10 and the wireless unit 20, but can even be one where power is transmitted contactlessly from an external power source to one or both of the sensor unit 10 and the wireless unit 20. When transmitting power contactlessly from an external power source, a power-receiving unit (second power transmitting unit) for receiving the power sent contactlessly from the external power source is provided in one or both of the sensor unit 10 and the wireless unit 20.

In the wireless device illustrated in FIG. 10, the local communication unit 13 and the contactless power transmission unit 17 are provided separately from each other inside the sensor unit 10, while the local communication unit 23 and the contactless power transmission unit 27 are provided separately from each other in the wireless unit 20. However, the local communication unit 13 and the contactless power transmission unit 17 can be formed together as a single component inside the sensor unit 10, and so too can the local communication unit 23 and the contactless power transmission unit 27 inside the wireless unit 20.

While the example described in the first preferred embodiment is one where input/output unit setting information Q1 and wireless unit setting information Q2 are registered (stored) in the wireless unit 20, it is acceptable to store, for example, the firmware of the sensor unit 10 or the firmware of the sensor itself. If the firmware is stored, when, for example, the wireless unit 20 has been attached to the sensor unit 10, the process can be one of determining whether the wireless unit 20 needs to update the firmware of the sensor unit 10, and if so, updating it automatically.

Since the firmware has a larger amount of data than the sensor data D, when it is sent via a wireless network, the load of the wireless network increases, and there is a danger that this will affect the running system. If the firmware is stored in the wireless unit 20 as described above, it will be sent to the sensor unit 10 via the local communication units 23 and 13, and can therefore be updated without affecting the running system.

While the example described in the preferred embodiment is one where the wireless device 1 measures the flow volume of the fluid as a state quantity in an industrial process, the invention can be applied in wireless devices that measure other state quantities (e.g., pressure, temperature, etc.). Also, while the example described in the preferred embodiment is one where the wireless device performs wireless communication compliant with ISA100.11a, the invention can be applied in a wireless device that performs wireless communication compliant with WirelessHART (Registered Trademark) or one that performs wireless communication compliant with ZigBee (Registered Trademark).

While the wireless device 1 described in the preferred embodiment includes the sensor unit 10 that measures a state quantity in the industrial process and the wireless unit 20 that performs wireless communication, the invention can also be applied in a wireless device including, instead of the sensor unit 10, an actuator unit (not illustrated) that manipulates a state quantity in the industrial process. This wireless device differs from the wireless device 1 described above in that the manipulation command (a command to the actuator unit) sent via the wireless network is received by the wireless communication unit 21 of the wireless unit 20 and sent by the local communication unit 23 to the actuator unit, which then manipulates the state quantity in the industrial process based on the manipulation command sent from the wireless unit 20.

The invention can also be applied when measuring or manipulating state quantities in processes other than an industrial process. Examples of processes other than industrial ones include control relating to power, buildings, water, agriculture, etc.

As used herein, the following directional terms "forward, rearward, above, downward, right, left, vertical, horizontal, below, transverse, row and column" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, unit or unit of a device includes hardware and software that is constructed and/or programmed to carry out the desired function.

Moreover, terms that are expressed as "means-plus function" in the claims should include any structure that can be utilized to carry out the function of that unit of the present invention.

The term "unit" is used to describe a component, unit or unit of a hardware and software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A wireless device comprising a sensor unit and a wireless unit that is detachable from the sensor unit,
   the sensor unit including:
   an input/output unit configured to perform at least one of measurement and manipulation of a state quantity in a process;
   a first local communication unit configured to perform local communication with a second local communication unit included in the wireless unit to transmit measurement results by the input/output unit to the second local communication unit or receive manipulation commands for the input/output unit from the second local communication unit; and
   a first supply unit configured to supply power to the input/output unit and the first local communication unit; and
   a first storage unit configured to store a wireless unit setting information that defines operations of the wireless unit;
   the wireless unit including:
   a wireless communication unit configured to transmit/receive data to/from outside via a wireless network;
   the second local communication unit configured to perform the local communication with the first local communication unit to receive the measurement results by the input/output unit from the first local communication unit or transmit the manipulation commands for the input/output unit to the first local communication unit;
   a second supply unit configured to supply power to the wireless communication unit and the second local communication unit;
   a second storage unit configured to store the wireless unit setting information;
   wherein the sensor unit further includes a first controller configured to read the wireless unit setting information out of the first storage unit and transmit the wireless unit setting information through the first local communication unit to the wireless unit.

2. The wireless device according to claim 1, wherein the first and second local communication units perform the local communication contactlessly.

3. The wireless device according to claim 2, wherein the sensor unit includes a first casing that houses at least the input/output unit and the first supply unit, and the wireless unit includes a second casing that houses at least the wireless communication unit and the second supply unit.

4. The wireless device according to claim 3, wherein the first casing includes a first signal transmission unit configured to allow transmission of signals to and from the first local communication unit housed in the first casing and the second local communication unit housed in the second casing,
the second casing includes a second signal transmission unit configured to allow the transmission of the signals to and from the first local communication unit housed in the first casing and the second local communication unit housed in the second casing, and
the sensor unit and the wireless unit are joined together such that the first signal transmission unit formed in the first casing and the second signal transmission unit formed in the second casing can transmit and receive the signals.

5. The wireless device according to claim 3, wherein one of a first signal transmission unit, configured to allow transmission of signals from the first local communication unit housed in the first casing, and a second signal transmission unit, configured to allow transmission of signals from the second local communication unit housed in the second casing, is formed in a first one of the first and second casings, and
one of the first local communication unit, arranged near the second signal transmission unit formed outside the first casing and in the second casing, and the second local communication unit, arranged near the first signal transmission unit formed outside the second casing and in the first casing, is connected via a cable to a second one of the first and second casings.

6. The wireless device according to claim 1, wherein the sensor unit and the wireless unit include storage units configured to store at least one of first setting information to be set in the sensor unit and second setting information to be set in the wireless unit.

7. The wireless device according to claim 6, wherein the first and second local communication units are configured to be capable of transmitting/receiving the first and second setting information in addition to at least one of the measurement results by the input/output unit and the manipulation commands for the input/output unit.

8. The wireless device according to claim 1, wherein
the first supply unit includes a first power source configured to supply power to be supplied to the input/output unit and the first local communication unit, and
the second supply unit includes a second power source configured to supply power to be supplied to the wireless communication unit and the second local communication unit.

9. The wireless device according to claim 1, wherein
the first supply unit includes a first power source configured to supply power to be supplied to the input/output unit and the first local communication unit, and
the second supply unit is configured to receive the power supplied from the first power source to supply the power to the wireless communication unit and the second local communication unit.

10. The wireless device according to claim 1, wherein
the second supply unit includes a second power source configured to supply power to be supplied to the wireless communication unit and the second local communication unit, and
the first supply unit is configured to receive the power supplied from the second power source to supply the power to the input/output unit and the first local communication unit.

11. The wireless device according to claim 1, wherein
the first supply unit is configured to supply power supplied from an external power source to the input/output unit and the first local communication unit, and
the second supply unit is configured to supply power supplied from the external power source to the wireless communication unit and the second local communication unit.

12. The wireless device according to claim 11, wherein the external power source is configured to supply power to both the first and second supply units.

13. The wireless device according to claim 11, wherein
the external power source is configured to supply power to a first one of the first and second supply units, and
a second one of the first and second supply units, which the external power source does not supply power to, is configured to receive power from the first one of the first and second supply units, which the external power source supplies power to.

14. The wireless device according to claim 9, wherein the sensor unit and the wireless unit include at least one of a first power transmission unit, configured to contactlessly transmit power between the first and second supply units, and a second power transmission unit, configured to contactlessly receive power from the external power source.

15. The wireless device according to claim 14, wherein the first power transmission unit is configured in a single structure with the first and second local communication units.

16. The wireless device according to claim 14, wherein one of the sensor unit and the wireless unit includes an accumulation unit configured to accumulate power received by one of the first supply unit and the second supply unit.

17. A method for setting a wireless device including a sensor unit and a wireless unit that is detachable from the sensor unit, the sensor unit including an input/output unit, a first local communication unit, a first supply unit, a first storage unit, and a first controller, and the wireless unit including a wireless communication unit, a first local communication unit, a second supply unit, and a second storage unit, the method comprising:
performing, by the input/output unit, at least one of measurement and manipulation of a state quantity in a process;
performing, by the first local communication unit, local communication with the second local communication unit included in the wireless unit to transmit measurement results by the input/output unit to the second local communication unit or receive manipulation commands for the input/output unit from the second local communication unit;
supplying, by a first supply unit, power to the input/output unit and the first local communication unit;
storing, into the first storage unit, a wireless unit setting information that defines operations of the wireless unit; and
transmitting/receiving, by the wireless communication unit, data to/from outside via a wireless network;
performing, the second local communication unit, the local communication with the first local communication unit to receive the measurement results by the input/output unit from the first local communication unit or transmit the manipulation commands for the input/output unit to the first local communication unit;
supplying, by the second supply unit, power to the wireless communication unit and the second local communication unit;
storing, in to the second storage unit, the wireless unit setting information;
reading, by the first controller, the wireless unit setting information out of the first storage unit; and
transmitting, by the first controller, the wireless unit setting information through the first local communication unit to the wireless unit.

18. A method for setting a wireless device, including a sensor unit and a wireless unit that is detachable from the sensor unit, wherein the sensor unit includes an input/output unit; a first local communication unit; a first supply unit; a first storage unit; and a first controller, and wherein the wireless unit includes a wireless communication unit; a first local communication unit; a second supply unit; and a second storage unit, the method comprising:
performing, by the sensor unit, at least one of measurement and manipulation of a state quantity in a process;
performing, by the wireless unit, wireless communication via a wireless network, including:
registering first setting information to be set in the sensor unit, and second setting information to be set in the wireless unit;
registering the first and second setting information registered in the wireless unit, in the sensor unit;

performing, by the first local communication unit, local communication with the second local communication unit included in the wireless unit to transmit measurement results by the input/output unit to the second local communication unit or receive manipulation commands for the input/output unit from the second local communication unit;

supplying, by the first supply unit, power to the input/output unit and the first local communication unit;

storing, into the first storage unit, a wireless unit setting information that defines operations of the wireless unit;

transmitting/receiving, by the wireless communication unit, data to/from outside via a wireless network;

performing, the second local communication unit, the local communication with the first local communication unit to receive the measurement results by the input/output unit from the first local communication unit or transmit the manipulation commands for the input/output unit to the first local communication unit;

supplying, by the second supply unit, power to the wireless communication unit and the second local communication unit;

storing, in to the second storage unit, the wireless unit setting information;

reading, by the first controller, the wireless unit setting information out of the first storage unit; and transmitting, by the first controller, the wireless unit setting information through the first local communication unit to the wireless unit.

\* \* \* \* \*